US011874610B2

(12) United States Patent
Kasuya

(10) Patent No.: US 11,874,610 B2
(45) Date of Patent: Jan. 16, 2024

(54) LIGHT-EMITTING DEVICE AND DRAWING APPARATUS

(71) Applicant: FUJIFILM BUSINESS INNOVATION CORP., Tokyo (JP)

(72) Inventor: Yosuke Kasuya, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/870,990

(22) Filed: Jul. 22, 2022

(65) Prior Publication Data
US 2022/0357682 A1 Nov. 10, 2022

Related U.S. Application Data

(63) Continuation of application No. PCT/JP2020/024296, filed on Jun. 22, 2020.

(30) Foreign Application Priority Data

Mar. 25, 2020 (JP) ................................ 2020-054927

(51) Int. Cl.
G03G 15/04 (2006.01)
(52) U.S. Cl.
CPC . *G03G 15/04036* (2013.01); *G03G 15/04045* (2013.01); *G03G 2215/0407* (2013.01)
(58) Field of Classification Search
None
See application file for complete search history.

(56) References Cited

U.S. PATENT DOCUMENTS

| 7,038,706 | B1 | 5/2006 | Hiyoshi |
| 9,981,482 | B2 | 5/2018 | Tanaka |
| 2006/0279626 | A1 | 12/2006 | Tu et al. |
| 2017/0282593 | A1 | 10/2017 | Tanaka |

FOREIGN PATENT DOCUMENTS

| JP | H11-119507 A | 4/1999 |
| JP | 2004-098436 A | 4/2004 |
| JP | 2009-113495 A | 5/2009 |
| JP | 2011-239448 A | 11/2011 |
| JP | 2017-177664 A | 10/2017 |

OTHER PUBLICATIONS

Sep. 8, 2020 International Search Report issued in International Patent Application No. PCT/JP2020/024296.
Sep. 8, 2020 Written Opinion issued in International Patent Application No. PCT/JP2020/024296.
Sep. 5, 2023 Office Action issued in Japanese Patent Application No. 2020-054927.

*Primary Examiner* — Walter L Lindsay, Jr.
*Assistant Examiner* — Geoffrey T Evans
(74) *Attorney, Agent, or Firm* — Oliff PLC

(57) ABSTRACT

A light-emitting device includes a base that extends in one direction; a light-emitting unit in which multiple light sources that are disposed in the one direction are supported by a supporting body that extends in the one direction and that is formed from a metal block; a spacer that is interposed between the base and the light-emitting unit in a direction of an optical axis of each light source; and a fixing unit that fixes the light-emitting unit to the base in a mode in which a compressive load is applied to the spacer.

18 Claims, 13 Drawing Sheets

LIGHT-EMITTING DEVICE AND DRAWING APPARATUS

CROSS-REFERENCE TO RELATED APPLICATIONS

This is a continuation of International Application No. PCT/JP2020/024296 filed on Jun. 22, 2020, and claims priority from Japanese Patent Application No. 2020-054927 filed on Mar. 25, 2020.

BACKGROUND

(i) Technical Field

The present disclosure relates to a light-emitting device and a drawing apparatus.

(ii) Related Art

Japanese Unexamined Patent Application Publication No. 2017-177664 discloses an exposure device including first light-emitting elements that are disposed side by side in a first direction and that each emit a first light beam; a first optical system that is disposed so as to oppose the first light-emitting elements in a second direction intersecting the first direction, and that focuses each first light beam emitted from a corresponding one of the first light-emitting elements; a first joint; a first exposure head that has a first base that supports the first light-emitting elements, the first optical system, and the first joint; second light-emitting elements that are disposed side by side in the first direction and that each emit a second light beam; a second optical system that is disposed so as to oppose the second light-emitting elements in the second direction and that focuses each second light beam emitted from a corresponding one of the second light-emitting elements; a second joint that is fitted to the first joint; and a second exposure head that has a second base that supports the second light-emitting elements, the second optical system, and the second joint. In the exposure device, of the first base, the first joint is provided at a first position corresponding to a focusing position of the first optical system, and, of the second base, the second joint is provided at a second position corresponding to a focusing position of the second optical system.

SUMMARY

Aspects of non-limiting embodiments of the present disclosure relate to a light-emitting device and a drawing apparatus, which suppresses variations in focuses resulting from the position of a light-emitting unit in one direction in comparison with a case in which a light-emitting unit is fixed to a base in a mode in which the light-emitting unit is in direct contact with the base.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a light-emitting device including a base that extends in one direction; a light-emitting unit in which light sources that are disposed in the one direction are supported by a supporting body that extends in the one direction and that is formed from a metal block; a spacer that is interposed between the base and the light-emitting unit in a direction of an optical axis of each light source; and a fixing unit that fixes the light-emitting unit to the base in a mode in which a compressive load is applied to the spacer.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure are described below.

First Exemplary Embodiment

Image Forming Apparatus 10

Figure 1:
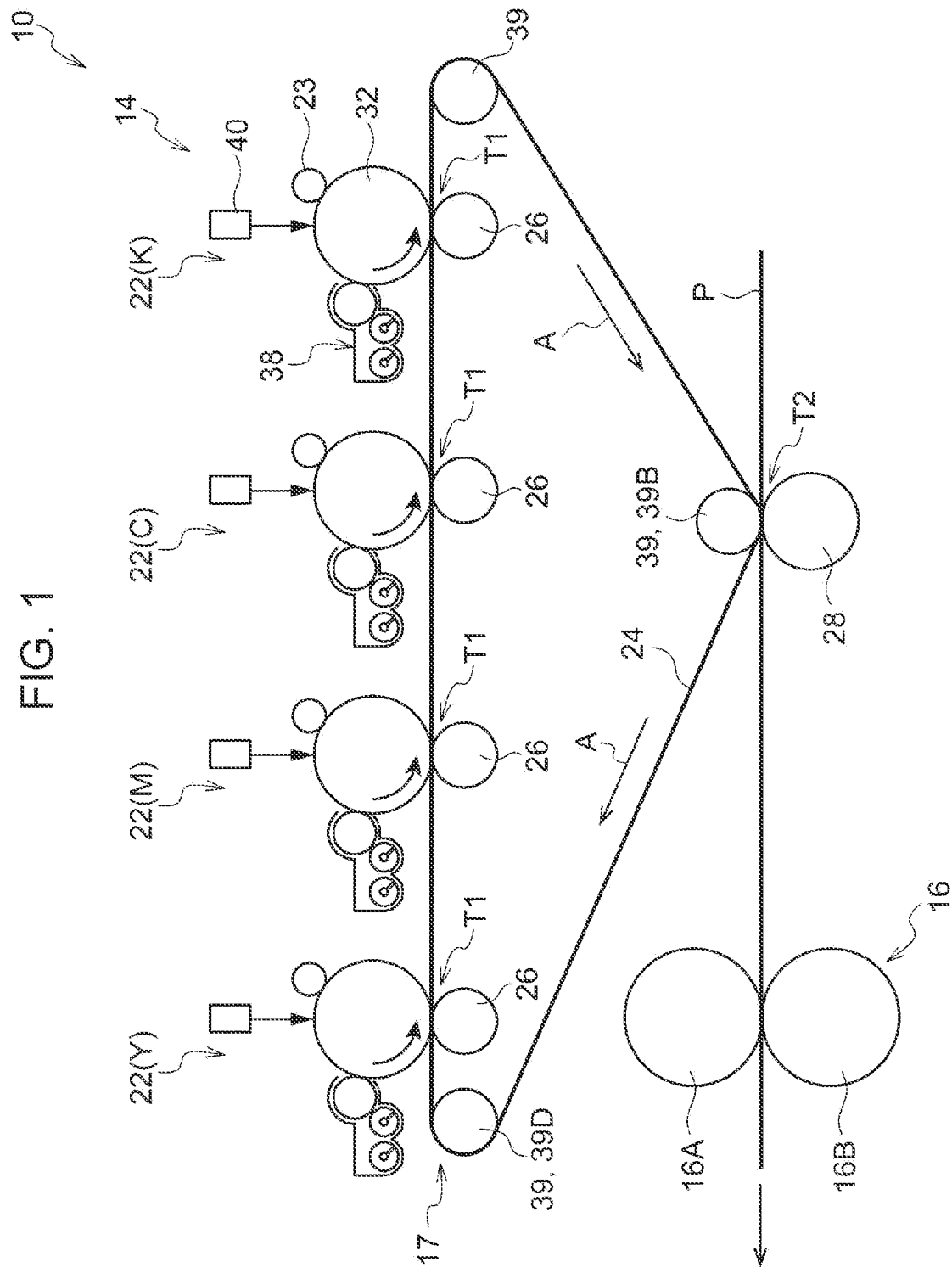
FIG. 1 is a schematic view illustrating an image forming apparatus including exposure devices according to a first exemplary embodiment.

FIG. 1 is a schematic view illustrating the structure of an image forming apparatus 10 including exposure devices 40 according to a first exemplary embodiment. First, the structure of the image forming apparatus 10 is described. Next, the exposure devices 40 using in the image forming apparatus 10 are described. Here, the image forming apparatus 10 is an example of a drawing apparatus, and each exposure device 40 is an example of a light-emitting device. The image forming apparatus 10 is, for example, an image forming apparatus that forms an image of multiple colors, and is, for example, a full-color printer for commercial printing particularly for a high image quality.

The image forming apparatus 10 is an image forming apparatus for wide widths corresponding to widths exceeding the width of a recording medium P in B3 vertical feeding (that is, widths exceeding 364 mm). In one example, the image forming apparatus 10 is used for a recording medium P having a size of 420 mm or larger in A2 vertical feeding and a recording medium P having a size of 1456 mm or less in B0 transverse feeding. For example, the image forming apparatus 10 is used for a recording medium P having a size of 728 mm in B2 transverse feeding.

The image forming apparatus 10 illustrated in FIG. 1 is an example of an image forming apparatus that forms an image on a recording medium. Specifically, the image forming apparatus 10 is an electrophotographic image forming apparatus that forms a toner image (an example of an image) on a recording medium P. Toner is an example of powder. More specifically, the image forming apparatus 10 includes an image forming device 14 and a fixing device 16. Each part (the image forming device 14 and the fixing device 16) of the image forming apparatus 10 is described below.

Image Forming Device 14

The image forming device 14 has the function of forming a toner image on a recording medium P. Specifically, the image forming device 14 includes toner image forming units 22 and a transfer device 17.

Toner Image Forming Units 22

The toner image forming units 22 illustrated in FIG. 1 form toner images of respective colors. In the exemplary embodiment, the toner image forming units 22 are toner image forming units for a total of four colors, that is, yellow (Y), magenta (M), cyan (C), and black (K). (Y), (M), (C), and (K) denote structural portions corresponding to the respective colors.

Note that, since the toner image forming units 22 for the respective colors have the same structure except for the toner used, in FIG. 1, each part of the toner image forming unit 22 (K) is given a reference numeral to represent the toner image forming units 22 for the respective colors.

The toner image forming units 22 for the respective colors each specifically have a photoconductor drum 32 that rotates in one direction (for example, counterclockwise in FIG. 1). Here, the photoconductor drum 32 is an example of a cylindrical member, and a photoconductor at a surface of the photoconductor drum 32 is an example of a region where a photosensitive material is disposed. Further, the toner image forming units 22 for the respective colors each have a charging unit 23, an exposure device 40, and a developing device 38.

In each of the toner image forming units 22 for the respective colors, the charging unit 23 charges the photoconductor drum 32. Further, each exposure device 40 exposes the photoconductor drum 32 charged by the charging unit 23, and forms an electrostatic latent image on the photoconductor drum 32. Each developing device 38 develops the electrostatic latent image formed on the photoconductor drum 32 by the exposure device 40, and forms a toner image.

Each photoconductor drum 32 holds on its outer periphery the electrostatic latent image formed as mentioned above, rotates, and transports the electrostatic latent image to the developing device 38. Note that the specific structure of each exposure device 40 is described below.

Transfer Device 17

The transfer device 17 illustrated in FIG. 1 is a device that transfers a toner image formed by the corresponding toner image forming unit 22 onto a recording medium P. Specifically, the transfer device 17 first-transfers the toner images on the photoconductor drums 32 for the respective colors by superimposing the toner images upon each other on a transfer belt 24, serving as an intermediate transfer body, and second-transfers the toner images that have been superimposed upon each other onto the recording medium P. Specifically, as illustrated in FIG. 1, the transfer device 17 includes the transfer belt 24, first transfer rollers 26, and a second transfer roller 28.

Each first-transfer roller 26 is a roller that transfers the toner image on the photoconductor drum 32 for the corresponding color onto the transfer belt 24 at a first transfer position T1 between the photoconductor drum 32 and the first transfer roller 26. In the exemplary embodiment, by applying a first transfer electric field between the first transfer roller 26 and the corresponding photoconductor drum 32, the toner image formed on the corresponding photoconductor drum 32 is transferred onto the transfer belt 24 at the corresponding first transfer position T1.

The toner images are transferred onto an outer peripheral surface of the transfer belt 24 from the photoconductor drums 32 for the respective colors. Specifically, the transfer belt 24 has the following structure. As illustrated in FIG. 1, the transfer belt 24 has a ring shape, and has its orientation determined by being wound around rollers 39.

The transfer belt 24 circulates in the direction of arrow A by, for example, a driving roller 39D among the rollers 39 being rotationally driven by a driving unit (not shown). Note that a roller 39B illustrated in FIG. 1 among the rollers 39 is an opposing roller 39B that opposes the second transfer roller 28.

The second transfer roller 28 is a roller that transfers the toner images transferred onto the transfer belt 24 onto a recording medium P at a second transfer position T2 between the opposing roller 39B and the second transfer roller 28. In the exemplary embodiment, by applying a second transfer electric field between the opposing roller 39B and the second transfer roller 28, the toner images transferred onto the transfer belt 24 are transferred onto the recording medium P at the second transfer position T2.

Fixing Device

The fixing device 16 illustrated in FIG. 1 is a device that fixes the toner images transferred onto the recording medium P by the second transfer roller 28 to the recording medium P. Specifically, as illustrated in FIG. 1, the fixing device 16 has a heating roller 16A, serving as a heating member, and a pressing roller 16B, serving as a pressing member. In the fixing device 16, by heating and pressing the recording medium P by the heating roller 16A and the pressing roller 16B, the toner images formed on the recording medium P are fixed to the recording medium P.

Exposure Devices 40

Figure 2:
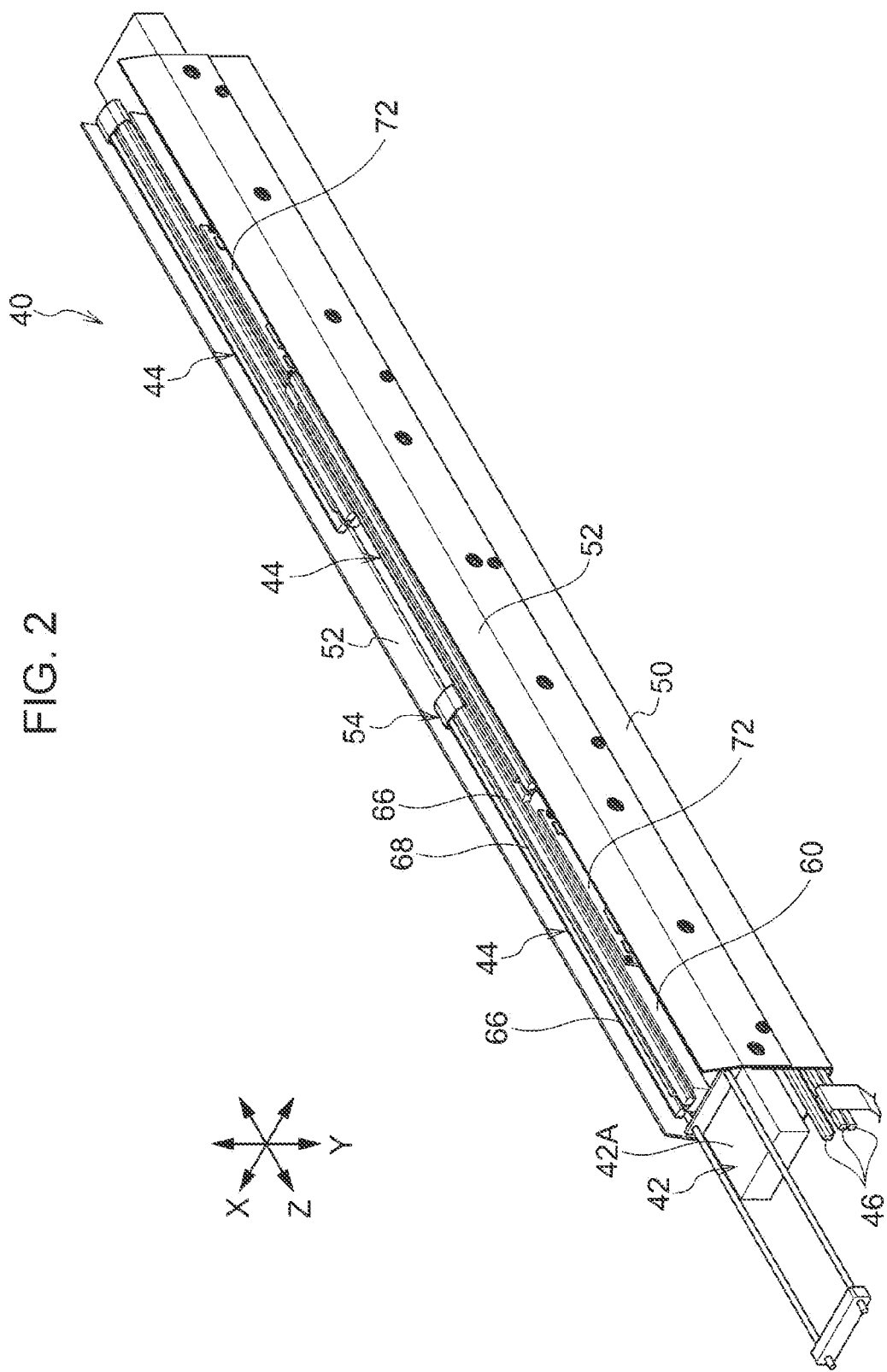
FIG. 2 is a perspective view illustrating an exposure device used in the image forming apparatus.
Figure 3:
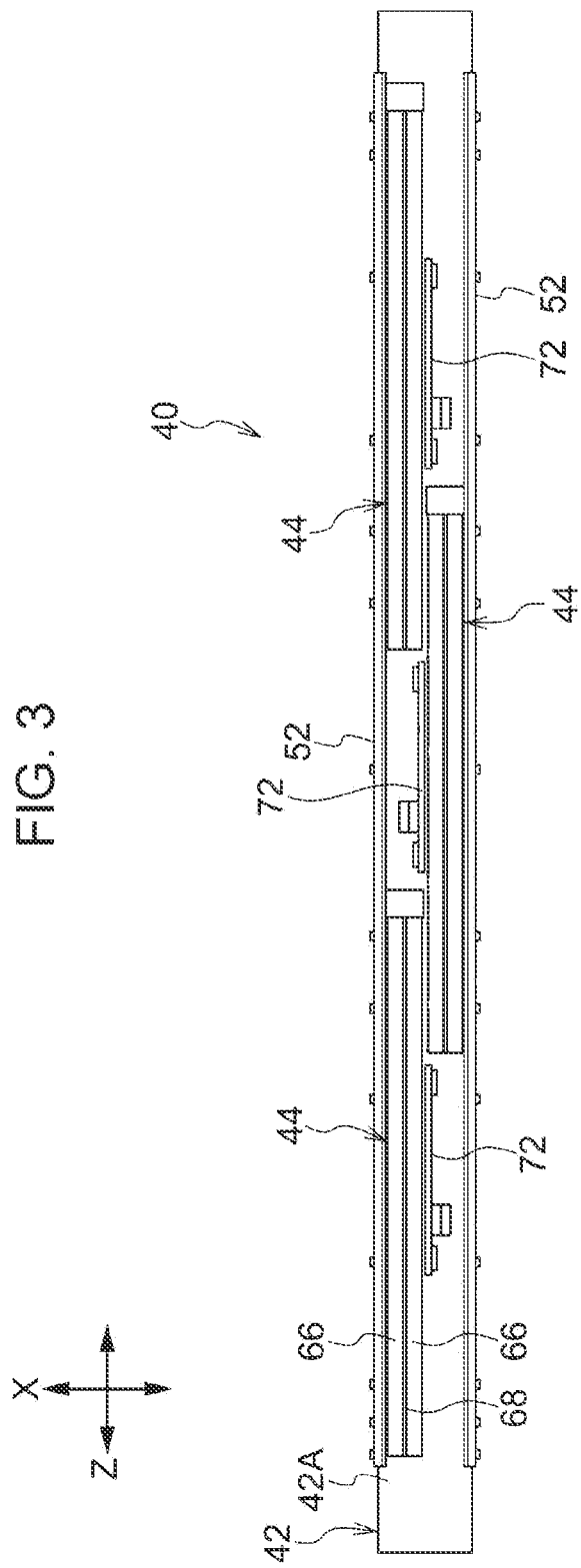
FIG. 3 is a structural view illustrating a state of the exposure device when seen from an up-down direction.

Next, the structure of each exposure device 40, which is a part of the exemplary embodiment, is described. FIG. 2 is a perspective view illustrating the structure of an exposure device 40. FIG. 3 is a plan view illustrating a state of the exposure device 40 when seen from an up-down direction. In the description below, the illustrated direction of arrow X is a width direction of the exposure device 40, and the illustrated direction of arrow Y is a height direction of the exposure device 40. The direction of arrow Z orthogonal to each of the device width direction and the device height direction is a depth direction of the exposure device 40. Note that, since the width direction and the height direction above are directions prescribed for explanatory convenience, the structure of the exposure device 40 is not limited to these directions.

First, the overall structure of an exposure device 40 is described. Then, each member of the exposure device 40 is described.

Overall Structures of Exposure Devices 40

As illustrated in FIGS. 2 and 3, the exposure device 40 includes a base 42 that extends in one direction (in the exemplary embodiment, the direction of arrow Z) and light-emitting units 44 that are provided on one side of the base 42 in the direction of arrow Y (in FIGS. 2 and 3, an upper side in an up-down direction. In the exemplary embodiment, three light-emitting units 44 that extend in one direction of the base 42 are provided. In plan view illustrated in FIG. 3, the base 42 is a rectangular long member. The light-emitting units 44 have the same structure, and are each a rectangular long member in plan view illustrated in FIG. 3. The length of each light-emitting unit 44 in one direction (that is, a longitudinal direction) is shorter than the length of the base 42 in the one direction (that is, the longitudinal direction).

In one example, the three light-emitting units 44 are disposed so as to be displaced from each other in the one direction (the direction of arrow Z) of the base 42, and are disposed so as to be displaced from each other in the width direction orthogonal to the one direction of the base 42, that is, in a transverse direction (the direction of arrow X) of the base 42. The exposure device 40 is disposed in an axial direction of the photoconductor drum 32 (see FIG. 1), and the length of the exposure device 40 in the one direction (the direction of arrow Z) is greater than or equal to the length of the photoconductor drum 32 in the axial direction. One or more of the three light-emitting units 44 oppose a region, where a photoconductor is disposed, of the surface of the photoconductor drum 32. Therefore, light emitted from the exposure device 40 illuminates the surface of the photoconductor drum 32.

In the exposure device 40 illustrated in, for example, FIGS. 2 and 3, the side of the base 42 where the light-emitting units 44 are provided is the upper side in the up-down direction, and light is emitted upward from the light-emitting units 44. However, in the image forming apparatus 10 illustrated in FIG. 1, the upper side and the lower side of each exposure device 40 are reversed. That is, in FIG. 1, each exposure device 40 is disposed so that the side of the base 42 where the light-emitting units 44 are provided is the lower side in the up-down direction, and light is emitted toward the photoconductor drum 32 that is disposed on the lower side from the light-emitting units 44.

In the exemplary embodiment, three light-emitting units 44 are disposed in a staggered arrangement when the exposure device 40 is seen from the upper side in the up-down direction (see FIG. 3). More specifically, two light-emitting units 44 are disposed on two end portions of the base 42 in the one direction (the direction of arrow Z) so as to be situated on one side of the base 42 in the transverse direction (the direction of arrow X). The remaining one light-emitting unit 44 is disposed at a central portion of the base 42 in the one direction (the direction of arrow Z) so as to be situated on the other side of the base 42 in the transverse direction (the direction of arrow X). An end portion of each of the two light-emitting units 44 disposed on the one side of the base 42 in the transverse direction (the direction of arrow X) overlap a corresponding one of end portions of the one light-emitting unit 44 disposed on the other side of the base 42 in the transverse direction (the direction of arrow X) when seen from the transverse direction (the direction of arrow X) of the base 42. That is, in the one direction (the direction of arrow Z) of the base 42, parts of illumination ranges of light from the three light-emitting units 44 overlap each other.

The two light-emitting units 44 disposed on the one side of the base 42 in the transverse direction (the direction of arrow X) do not overlap the one light-emitting unit 44 disposed on the other side of the base 42 in the transverse direction (the direction of arrow X) when seen from the one direction (the direction of arrow Z) of the base 42.

Figure 4:
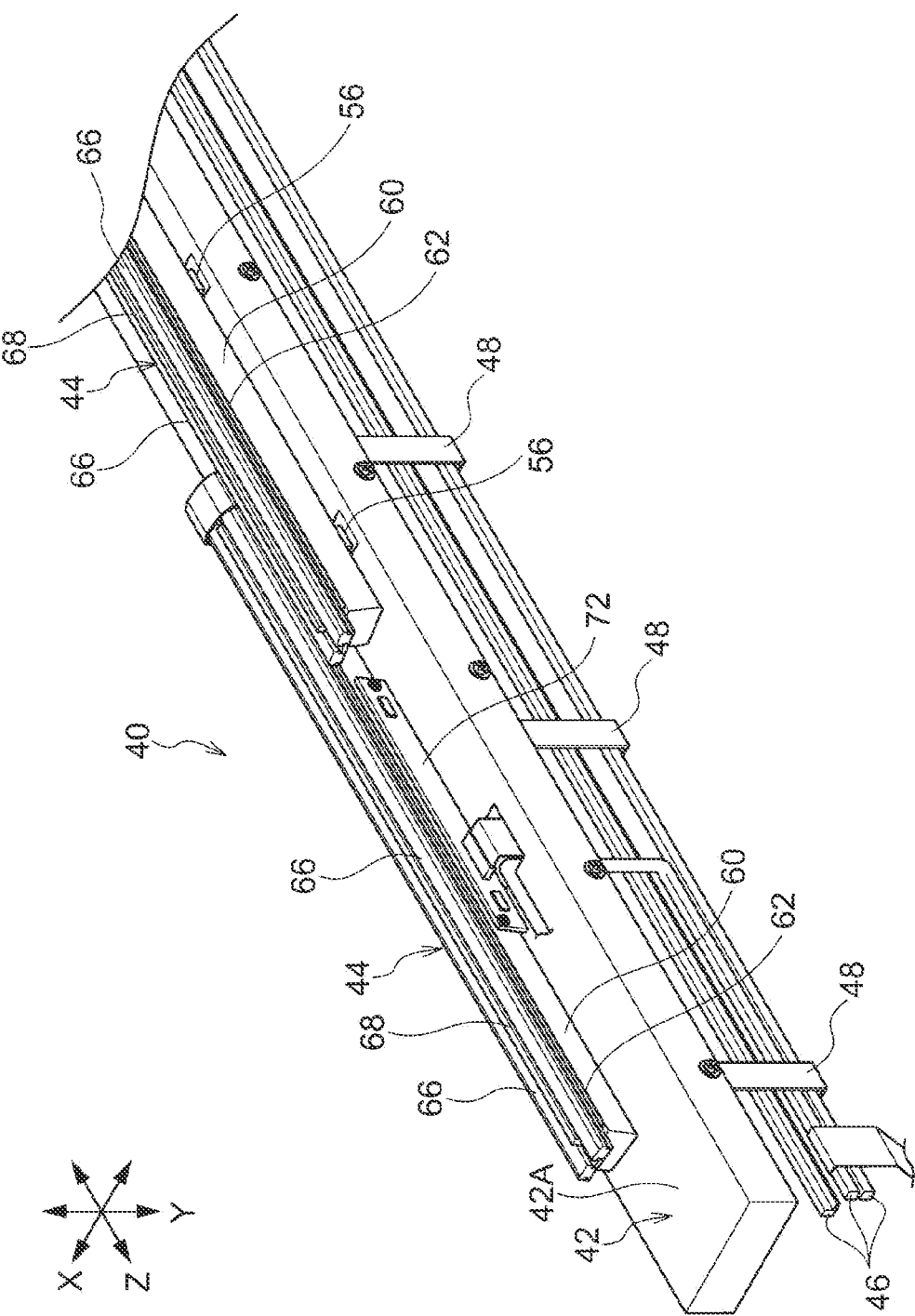
FIG. 4 is a partially enlarged perspective view of the exposure device.

As shown in FIGS. 2 and 4, the exposure device 40 includes a harness 46 that is electrically connected to the three light-emitting units 44, brackets 48 that support the harness 46, and a lower cover 50 that covers the harness 46 and the brackets 48 from an outer side. The brackets 48 are attached to the base 42, and extend toward the other side of the base 42 in the direction of arrow Y (in FIG. 2, the lower side in the up-down direction). The lower cover 50 is attached to the other side of the base 42 in the direction of arrow Y (in FIG. 2, the lower side in the up-down direction).

As illustrated in FIGS. 2 and 3, the exposure device 40 includes a side cover 52 that covers a side of each of the three light-emitting units 44. The side cover 52 has a plate shape, and its lower end portion is attached to two sides of the base 42 in the transverse direction (the direction of arrow X). The exposure device 40 includes a cleaning device 54 that cleans lens portions 68 (described below) of the light-emitting units 44.

Further, as illustrated in FIGS. 5 to 8, the exposure device 40 includes spacers 56 that are interposed between the base 42 and the light-emitting units 44, and fastening members 58, serving as examples of fixing units, that fix the light-emitting units 44 to the base 42 with the spacers 56 interposed therebetween. Each fastening member 58 is a member that has, for example, a spiral groove, and that is used for fastening by using the groove. In other words, each fastening member 58 is a member having a threaded mechanism, and is, for example, a screw thread, a bolt, or a screw.

Note that, although not illustrated, positioning shafts that extend upward in the up-down direction are provided on two end portions of the base 42 in the one direction (the direction of arrow Z). Each positioning shaft positions an illumination direction of the exposure device 40 with respect to the photoconductor drum 32 by coming into contact with a corresponding one of bearing members provided on two ends of the photoconductor drum 32.

Bases 42

As illustrated in FIGS. 5 to 8, the base 42 is formed from a parallelepiped elongated member. The base 42 is disposed at a position opposing the entire length of the photoconductor drum 32 (FIG. 1) in the axial direction. A front surface 42A of the base 42 on the upper side in the up-down direction (the direction of arrow Y) has recessed portions 80 in which the spacers 56 are inserted. In one example, with respect to one light-emitting unit 44, three spacers 56 are disposed apart from each other in the one direction (the direction of arrow Z). That is, with respect to each of the three light-emitting units 44, three spacers 56 (nine spacers 56 in all) are disposed. Therefore, the base 42 has nine recessed portions 80 in which nine spacers 56 are inserted.

Figure 5:
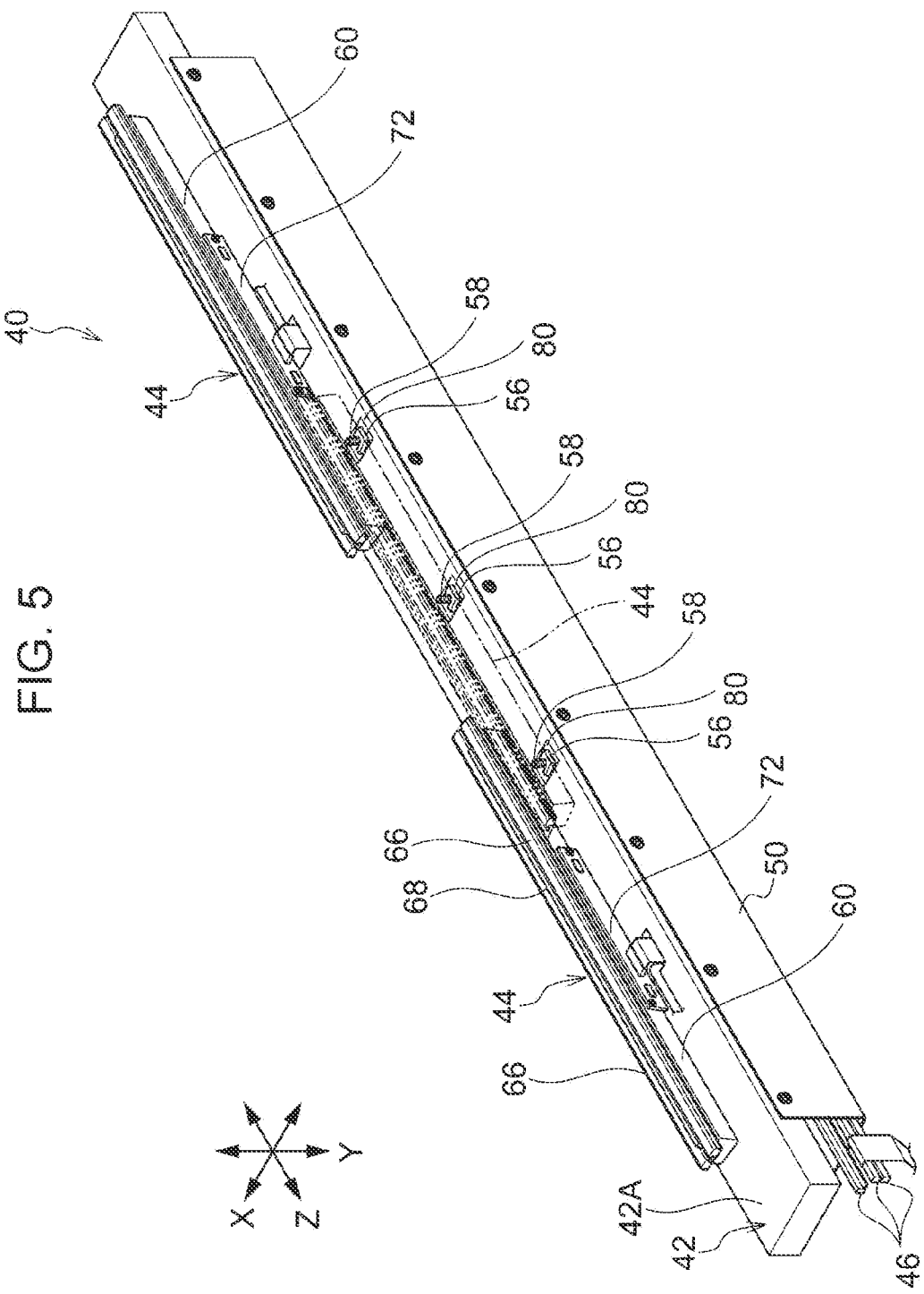
FIG. 5 is a perspective view illustrating spacers of the exposure device.
Figure 6:
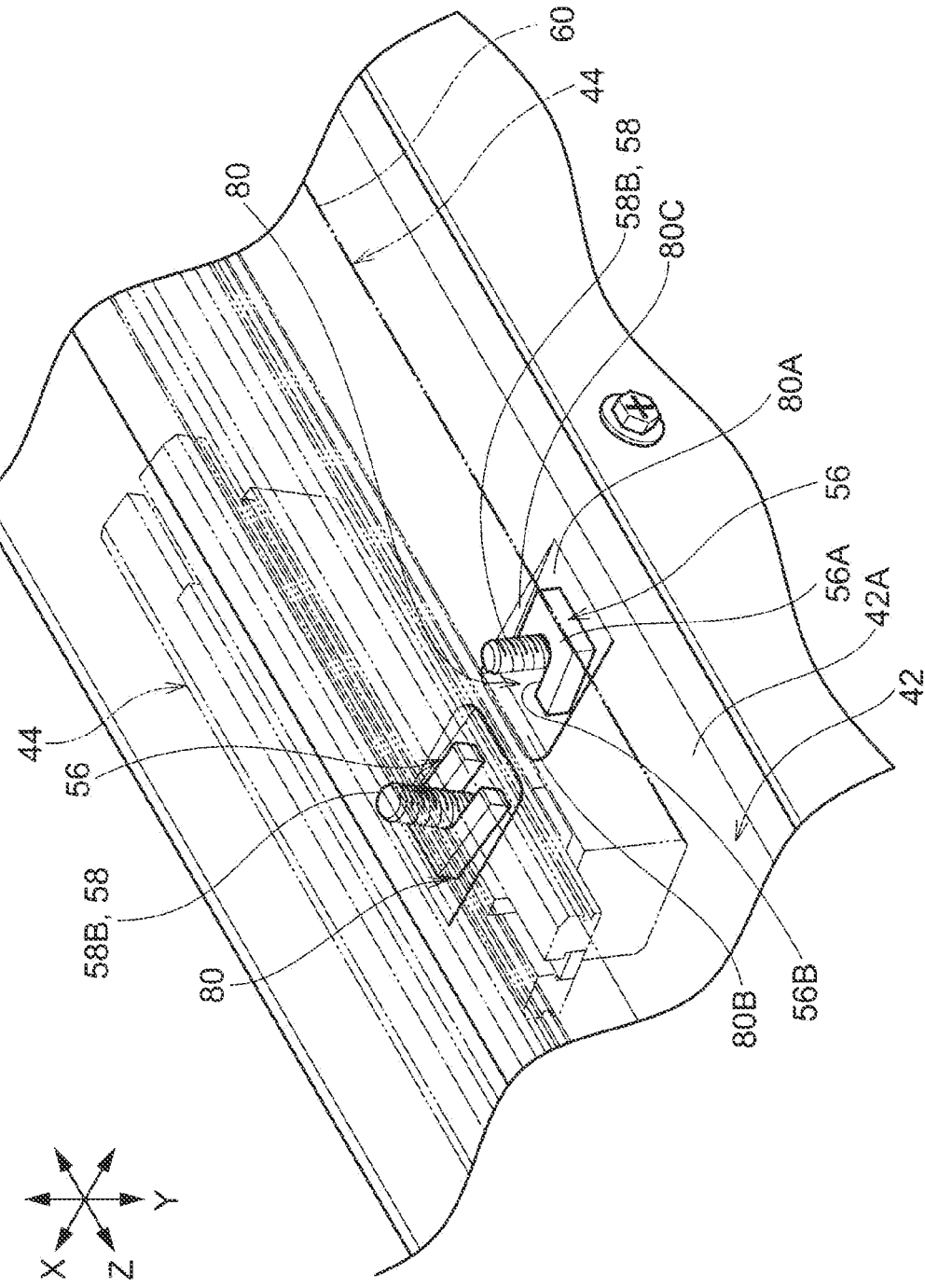
FIG. 6 is an enlarged perspective view illustrating the spacers of the exposure device.
Figure 9:
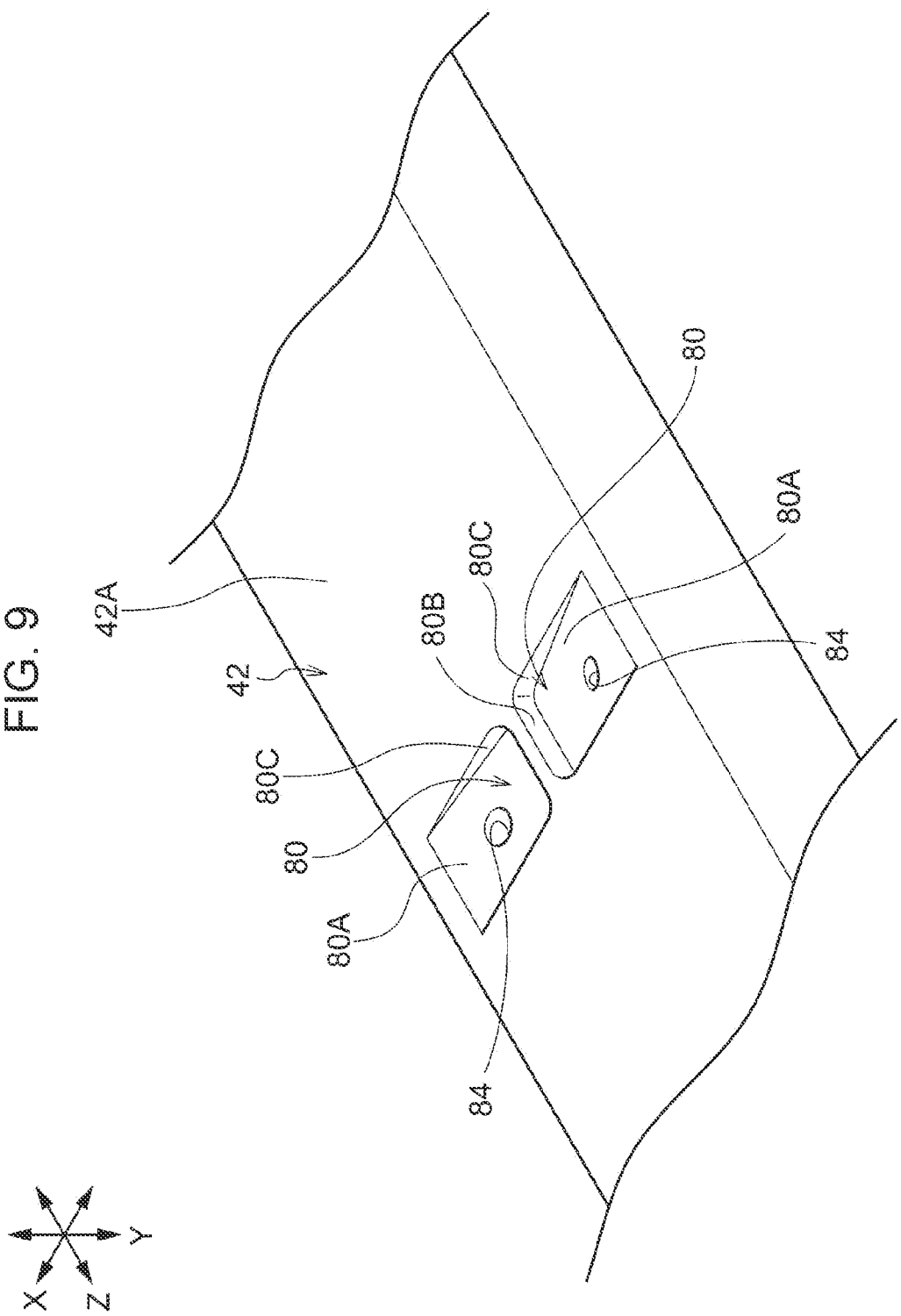
FIG. 9 is a perspective view illustrating recessed portions, in which spacers are to be disposed, of a base of the exposure device.

In the exemplary embodiment, as illustrated in FIG. 5, three recessed portions 80 are disposed at the central portion of the base 42 in the one direction (the direction of arrow Z) so as to be situated at positions opposing the one light-emitting unit 44 on the other side of the base 42 in the transverse direction (the direction of arrow X). In the same way, as not illustrated in FIG. 5, three recessed portions 80 are disposed at each of two end portion sides of the base 42 in the one direction (the direction of arrow Z) so as to be situated at positions opposing the two light-emitting units 44 on the one side of the base 42 in the transverse direction (the direction of arrow X). As illustrated in FIG. 9, a shape of each of the six recessed portions 80 that are disposed on the one side of the base 42 in the transverse direction (the direction of arrow X) and shapes of each of the three recessed portions 80 that are disposed on the other side of the base 42 in the transverse direction (the direction of arrow X) are symmetrical shapes in the transverse direction (the direction of arrow X) of the base 42.

Each recessed portion 80 includes an inclined surface 80A that forms a bottom surface and that is inclined with respect to the front surface 42A of the base 42, a vertical wall 80B that is disposed at an end portion of the inclined surface BOA in a descending direction, and two vertical walls 80C that are formed along the inclined surface BOA and that are disposed so as to oppose each other (see FIG. 9). Note that, in FIG. 9, only one of the vertical walls 80C can be seen. Each inclined surface 80A is inclined in the transverse direction (the direction of arrow X) of the base 42. The end portion of each inclined surface 80A in the descending direction is formed continuously with the vertical wall 80B, and an end portion of each inclined surface 80A in an ascending direction is formed continuously with the front surface 42A of the base 42. That is, each recessed portion 80 does not have a wall on an end portion side in the transverse direction of the base 42.

In one example, the inclined surfaces 80A for the two light-emitting portions 44 disposed on the one side of the base 42 in the transverse direction and the inclined surfaces 80A for the one light-emitting unit 44 disposed on the other side of the base 42 in the transverse direction are inclined in opposite directions. In the exemplary embodiment, each inclined surface 80A is inclined so as to have a descending slope toward the central portion from a corresponding end portion side of the base 42 in the transverse direction (direction X). The inclined surfaces 80A of the base 42 on the one side in the transverse direction and the inclined surfaces 80A of the base 42 on the other side of the base 42 in the transverse direction are symmetrical on the left and right sides in the transverse direction of the base 42, that is, have the same angle with respect to the front surface 42A of the base 42. In the exposure device 40, by using the inclined surfaces 80A that are inclined in opposite directions, light from the two light-emitting units 44 disposed on the one side of the base 42 in the transverse direction and from the one light-emitting unit 44 disposed on the other side of the base 42 in the transverse direction is adjusted so as to be emitted toward a central portion of the photoconductor drum 32 (see FIG. 1). In other words, with the exposure device 40 being positioned with respect to the photoconductor drum 32, the inclined surfaces 80A are inclined so that optical axes of the light-emitting units 44 disposed on the one side of the base 42 in the transverse direction and an optical axis of the light-emitting unit 44 disposed on the other side of the base 42 in the transverse direction intersect a rotation center of the photoconductor drum 32.

In the exemplary embodiment, each base 42 is formed from a metal block. "Metal block" in the exemplary embodiment refers to a lump of metal that does not include a general sheet metal shaped by bending, and has a thickness that is substantially not capable of being bent into a shape used for the base of each exposure device 40. In one example, the metal block is the lump of metal may be one in which the thickness of the base 42 is 10% or greater of the width of the base 42. Further, the metal block is the lump of metal may be one in which the thickness of the base 42 is 20% or greater and 1005 or less of the width of the base 42.

An image forming apparatus for wide widths of the related art is for outputting black-and-white drawings of which a high image quality is not demanded compared with full-color printers for commercial printing, and uses a sheet metal as a base. On the other hand, the image forming apparatus 10 according to the exemplary embodiment is a full-color printer for commercial printing, and is for providing a high image quality. Therefore, in order to suppress the influence on image quality by the flexing of a base 42, a metal block having a rigidity that is higher than that of a sheet metal is used.

Each base 42 is made of, for example, steel or stainless steel. Here, each base 42 may be formed from a metal block other than steel or stainless steel. For example, aluminum having a thermal conductivity that is higher than that of steel or stainless steel, and that is lighter than steel or stainless steel may be used. However, in the exemplary embodiment, heat that is generated by light sources 64 is generally dissipated by supporting bodies 60. Therefore, in each base 42, steel or stainless steel is used with rigidity having priority over thermal conductivity and weight.

Each recessed portion 80 is formed by cutting the base 42, and each inclined surface 80A is defined as a cut surface. Although, in a base made of a sheet metal of the related art, an inclined surface is formed by bending, in a metal block of the exemplary embodiment, each inclined surface 80A is formed by cutting. Since the inclined surfaces 80A are formed by cutting, high surface precision may be ensured compared with when a sheet metal is used, and thus a high image quality may be easily realized compared with when a sheet metal is used. The surface precision of each inclined surface 80A is higher than the surface precision of the front surface 42A of each base 42. Here, "surface precision" refers to a shape error with respect to an ideal surface of a processed surface.

The thickness of each base 42 in the up-down direction (the direction of arrow Y) may be larger than the thickness of the supporting body 60 that constitutes the corresponding light-emitting unit 44. Therefore, the rigidity of each base 42 (the bending rigidity in the direction of arrow Y) is larger than the rigidity of the light-emitting units 44. The thickness of each base 42 in the up-down direction (the direction of arrow Y) is preferably 5 mm or greater, more preferably, 10 mm or greater, and even more preferably 20 mm or greater.

Figure 7:
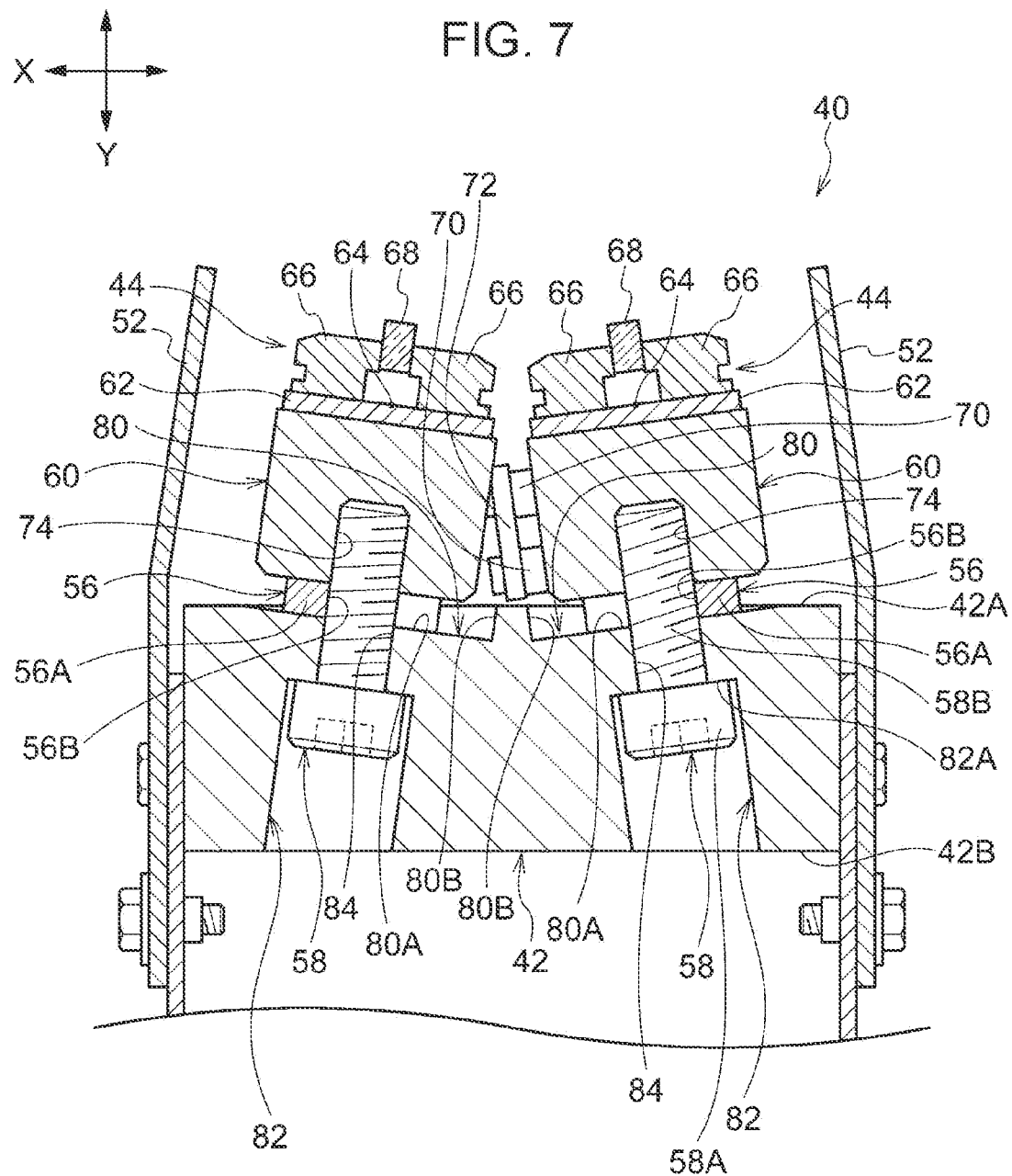
FIG. 7 illustrates a part of the exposure device and is a sectional view illustrating the spacers.
Figure 8:
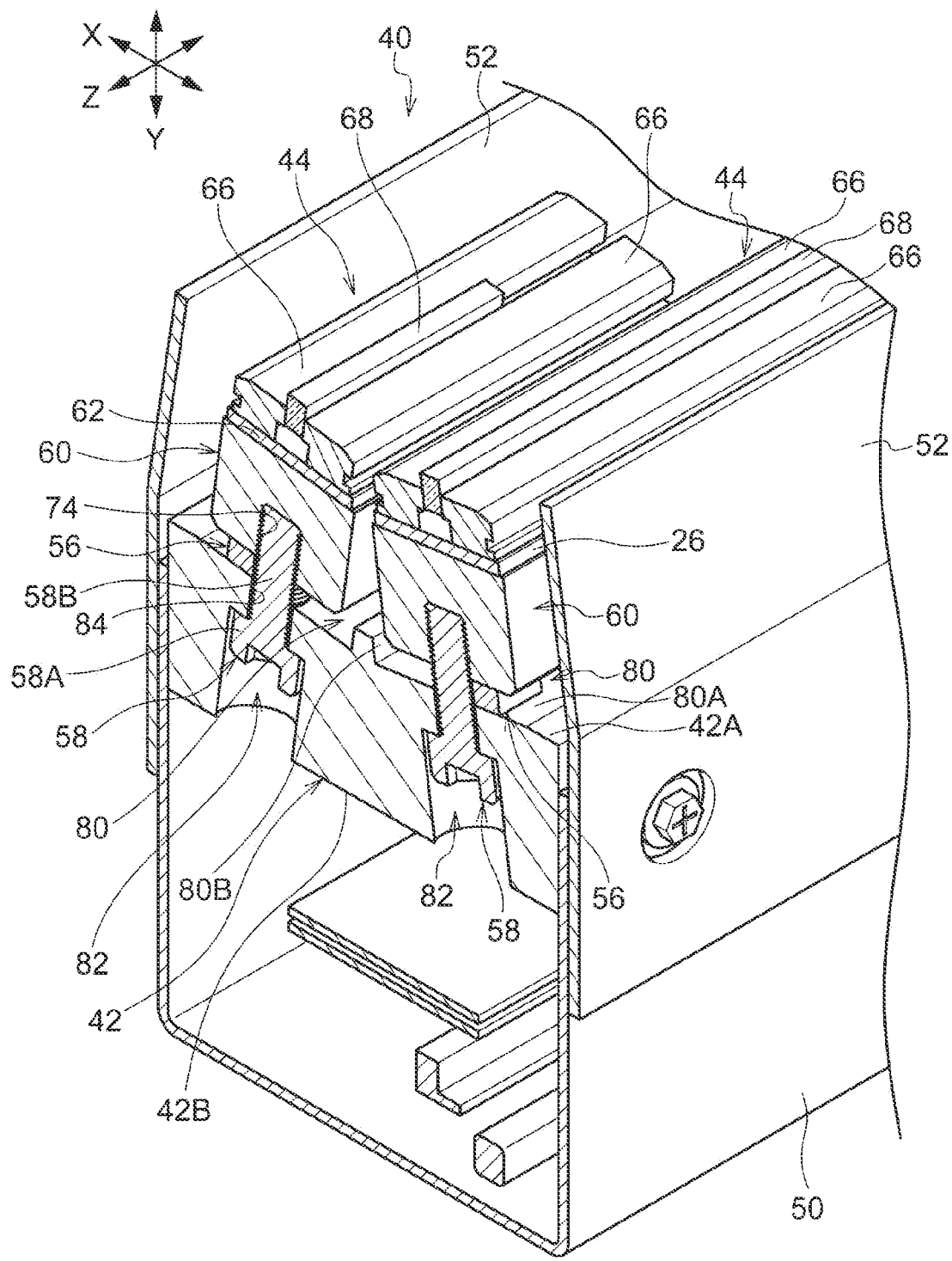
FIG. 8 is a perspective view illustrating a state in which the exposure device has been cut in a direction orthogonal to a longitudinal direction.

As illustrated in FIGS. 7 and 8, recess-like portions 82 that have been cut out toward the spacers 56, that is, toward the recessed portions 80 are formed in a back surface 42B of the base 42 on a side opposite to the front surface 42A. Here, the back surface 42B of the base 42 is an example of a surface opposite to the spacers 56. Each recess-like portion 82 is provided at a position corresponding to the corresponding recessed portion 80 of the base 42.

Each recess-like portion 82 is formed in an oblique direction toward the central portion of the base 42 in the transverse direction (direction X) from the back surface 42B of the base 42. In one example, a bottom surface 82A of each recess-like portion 82 and the corresponding inclined surface 80A are such that their inclination angles with respect to the front surface 42A of the base 42 are the same. That is, the thickness of the base 42 at the bottom surface 82A in the up-down direction is uniform. For example, each recess-like portion 82 has an elliptic shape when seen from the back surface 42B of the base 42. The inside diameter of each recess-like portion 82 is larger than an external shape of a head portion 58A of the corresponding fastening member 58. The bottom surface 82A of each recess-like portion 82 has a through hole 84 where a shaft portion 58B of the corresponding fastening member 58 passes through the base 42. Each through hole 84 opens into the inclined surface 80A of the corresponding recessed portion 80.

Light-Emitting Units 44

Three light-emitting units 44 have the same structure. In one example, two light-emitting units 44 on one side of the base 42 in the transverse direction (the direction of arrow X) and one light-emitting unit 44 on the other side of the base 42 in the transverse direction (the direction of arrow X) are disposed symmetrically in the transverse direction (the direction of arrow X) of the base 42.

As illustrated in FIGS. 7 and 8, each light-emitting unit 44 includes the supporting body 60 that extends in the one direction (the direction of arrow Z) and a light-emitting-element substrate 62 that is supported on a surface of the supporting body 60 on a side opposite to the base 42 in the up-down direction (the direction of arrow Y) (in the exemplary embodiment, an upper surface). The light sources 64 that are disposed in one direction are provided on the light-emitting-element substrate 62. In the exemplary embodiment, the light sources 64 include, for example, light-emitting elements. In one example, the light sources 64 are light-emitting-element arrays each having a semiconductor substrate and the light-emitting elements formed on the semiconductor substrate in one direction. In the exemplary embodiment, the light-emitting-element arrays, which correspond to the light sources 64, have a staggered arrangement on the corresponding light-emitting-element substrates 62 in one direction. Note that the light sources 64 may be single light-emitting elements instead of light-emitting-element arrays. Each individual light-emitting element is formed from, for example, a light-emitting diode, a light-emitting thyristor, or a laser element. With each light-emitting element being disposed in one direction, in one example, each light-emitting element has a resolution of 2400 dpi. The light-emitting-element substrates 62 are substrates for causing any one or more of the light sources 64 to emit light. FIG. 7 illustrates only one light source 64 provided at a corresponding one of the light-emitting units 44, and does not illustrate the other light sources.

Each light-emitting unit 44 includes two mounting portions 66 that are provided on a surface of the light-emitting-element substrate 62 on a side opposite to the supporting body 60, and the lens portion 68 that is held so as to be interposed between upper end portions of the two mounting portions 66.

The two mounting portions 66 and the lens portion 68 extend in one direction (the direction of arrow Z) of the corresponding supporting body 60 (see, for example, FIG. 4). The lens portion 68 is disposed at a position opposing the light sources 64, and the lens portion 68 and the light sources 64 are spaced from each other. In each exposure device 40, light emitted from the light sources 64 passes through the lens portions 68 and illuminates the surface of the photoconductor drum 32 (see FIG. 1), which is an object to be illuminated.

Each light-emitting unit 44 includes a driving substrate 72 that is attached to the supporting body 60 via an attachment tool 70. In other words, the attachment tool 70 forms a gap between the supporting body 60 and the driving substrate 72. The driving substrate 72 is a substrate for driving the corresponding light-emitting unit 44, and, for example, an ASIC (application specific integrated circuit) substrate is used.

Each supporting body 60 is formed from a parallelepiped member. In the exemplary embodiment, similarly to each base 42, each supporting body 60 is formed from a metal block. For example, each supporting body 60 is made of steel or stainless steel. Here, each base 42 may be formed from a metal block other than steel or stainless steel. For example, a metal block of aluminum having a thermal conductivity that is higher than that of steel or stainless steel, and that is lighter than steel or stainless steel may be used. However, when the thermal expansion coefficient of each base 42 and the thermal expansion coefficient of each supporting body 60 differ from each other, distortion or flexing may occur. Therefore, from the viewpoint of suppressing distortion or flexing, the bases 42 and the supporting bodies 60 may be made of the same material.

A surface of each supporting body 60 on a side of the corresponding base 42 has a threaded hole 74 to which the shaft portion 58B of the corresponding fastening member 58 is fastened. The threaded hole 74 is provided at a position opposing the corresponding through hole 84 of the base 42.

With each fastening member 58 being inserted in corresponding the recess-like portion 82 of the base 42 and the shaft portion 58B of the fastening member 58 passing through the corresponding through hole 84 of the base 42, the shaft portion 58B of the corresponding fastening member 58 is fastened to the threaded hole 74 of the corresponding supporting body 60 through the corresponding spacer 56. Therefore, each light-emitting unit 44 is fixed to the base 42 by the corresponding fastening member 58 from the inside of the corresponding recess-like portion 82 of the base 42. With each light-emitting unit 44 being fixed to the base 42 by the corresponding fastening member 58, each spacer 56 is interposed between the base 42 and the corresponding supporting body 60.

Here, a method of fixing a light-emitting unit 44 to a base 42 from a front side (light-exiting surface side) of a supporting body 60 to a front side of the base 42 can be considered. However, unlike a supporting body made of a resin material or a supporting body formed from a sheet metal, the supporting body 60 of the exemplary embodiment is formed from a metal block having a high mass. Therefore, a size of the fastening member 58 needs to be commensurate with the mass. In this case, a spacer for the large fastening member 58 is to be provided on the front side of the supporting body 60, and the size of the supporting body 60 becomes large. Therefore, in the exemplary embodiment, the fastening is performed from a back-surface side of the supporting body 60.

In a structure in which fastening members 58 are provided not only on the two end sides of a supporting body 60 but also on a central portion side of the supporting body 60, since a light source 64 exists on the central portion side, it may be difficult to perform the fastening from the front side of the supporting body 60. Therefore, by using a structure in which the fastening is performed from the back side of a base 42, the fastening is performed only from the back side of the base 42 in the structure in which the two end sides and the central portion side of the supporting body 60 are to be fastened.

Note that, when viewed from a direction of the optical axis of each light source 64, the threaded holes 74 and the recess-like portions 82 of each base 42 are provided at positions overlapping the light sources 64. Due to this structure, compared with when the threaded holes 74 and the recess-like portions 82 of each base 42 are provided at positions that do not overlap the light sources 64, heat generated by the light sources 64 may easily escape toward the bases 42 through the fastening members 58.

Spacers 56

Figure 10:
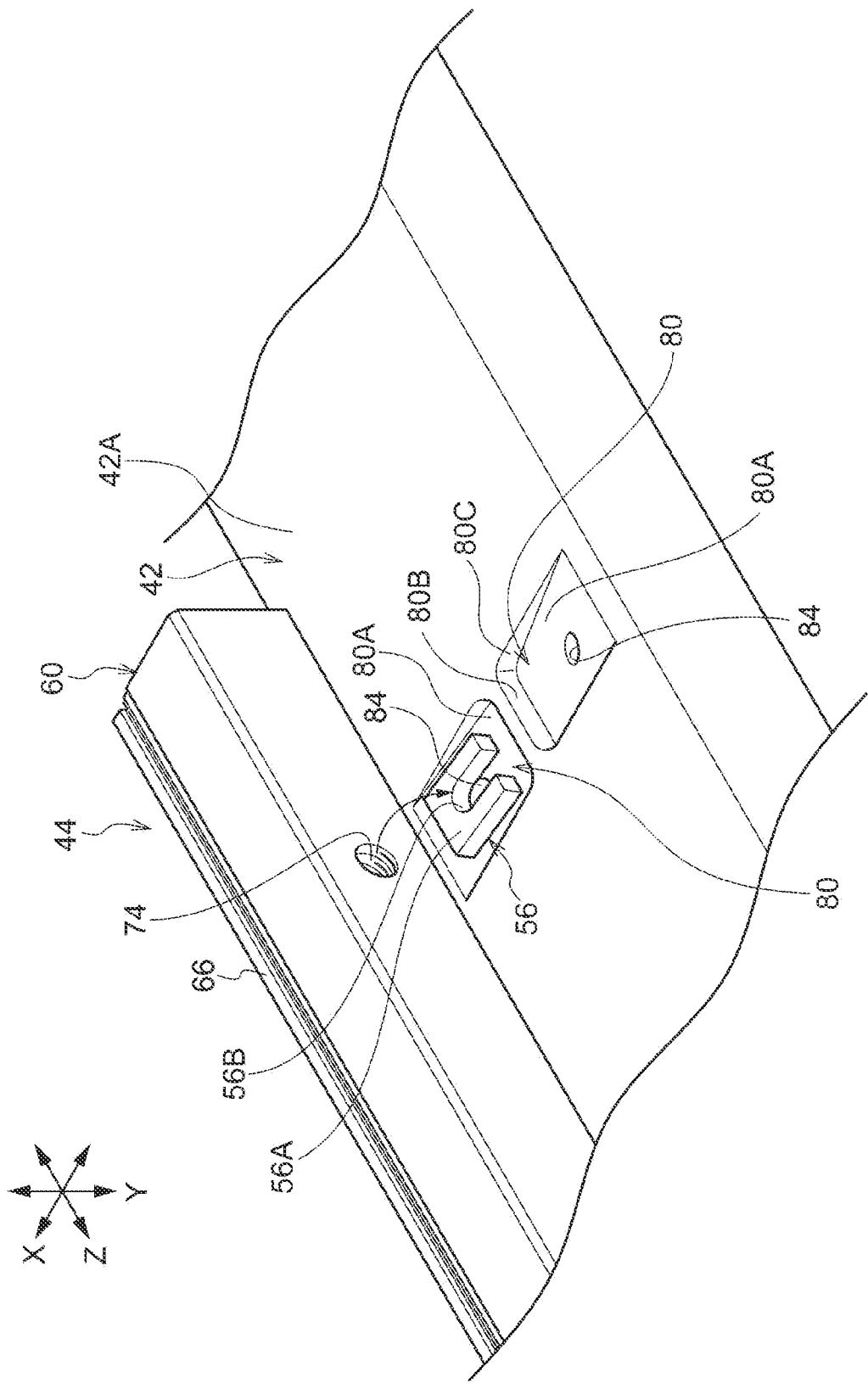
FIG. 10 is a perspective view illustrating a state in which a spacer is disposed in a recessed portion that is a part of the base of the exposure device.

As illustrated in FIGS. 5 to 8, each spacer 56 is interposed between the base 42 and the corresponding light-emitting unit 44 in the direction of the optical axis of each light source 64. In one example, each spacer 56 has a plate shape, and is formed from one member (that is, a single member). Each spacer 56 is disposed on the inclined surface 80A of the corresponding recessed portion 80 of the base 42 (see FIG. 10). At positions where the spacers 56 are disposed on the inclined surfaces 80A, the thickness of the spacers 56 is greater than or equal to the depth of the recessed portions 80 (see FIG. 7). Each fastening member 58 fixes the corresponding light-emitting unit 44 to the base 42 in a mode in which a compressive load is applied to the corresponding spacer 56.

Each spacer 56 is made of a material having a thermal conductivity that is higher than that of polyacetal resin (POM). Examples of materials having a thermal conductivity that is higher than that of polyacetal resin include a metal and ceramic. The thermal conductivity of polyacetal resin is 0.25 W/m·K. The thermal conductivity of silicon carbide (SiC), which is an example of a ceramic, is 60 W/m-K, and the thermal conductivity of carbon steel, which is an example of a metal, is 41 W/m-K. Here, the thermal conductivities are values measured based on JIS R1611-1997. In the exemplary embodiment, each spacer 56 is made of steel or stainless steel. Therefore, each spacer 56 forms a heat-dissipation path toward the base 42 from the supporting body 60 of the corresponding light-emitting unit 44. In each exposure device 40, heat from the light-emitting-element substrate 62 and the driving substrate 72 of each light-emitting unit 44 is dissipated to the base 42 from the supporting bodies 60 through the spacers 56. Therefore, each spacer 56 is a part of the heat-dissipation path when the heat is dissipated to the corresponding base 42 from the corresponding supporting body 60 through the spacer 56.

In one example, each spacer 56 has a U shape when viewed from the direction of the optical axis of each light source 64. In the exemplary embodiment, each spacer 56 includes a rectangular plate-shaped portion 56A and a hollow portion 56B formed by cutting out the plate-shaped portion 56A from one side. With each spacer 56 being disposed on the inclined surface 80A of the corresponding recessed portion 80 of the base 42, the hollow portion 56B surrounds a part of a periphery of the corresponding through hole 84 (for example, a semicircular portion of the corresponding through hole 84) (see FIG. 10). In one example, each spacer 56 is disposed in a direction in which an open side of the hollow portion 56B faces the descending slope of the corresponding inclined surface 80A, that is, in a direction in which the open side of the hollow portion 56B faces an inner side of the corresponding base 42 in the transverse direction (the direction of arrow X).

Figure 11:
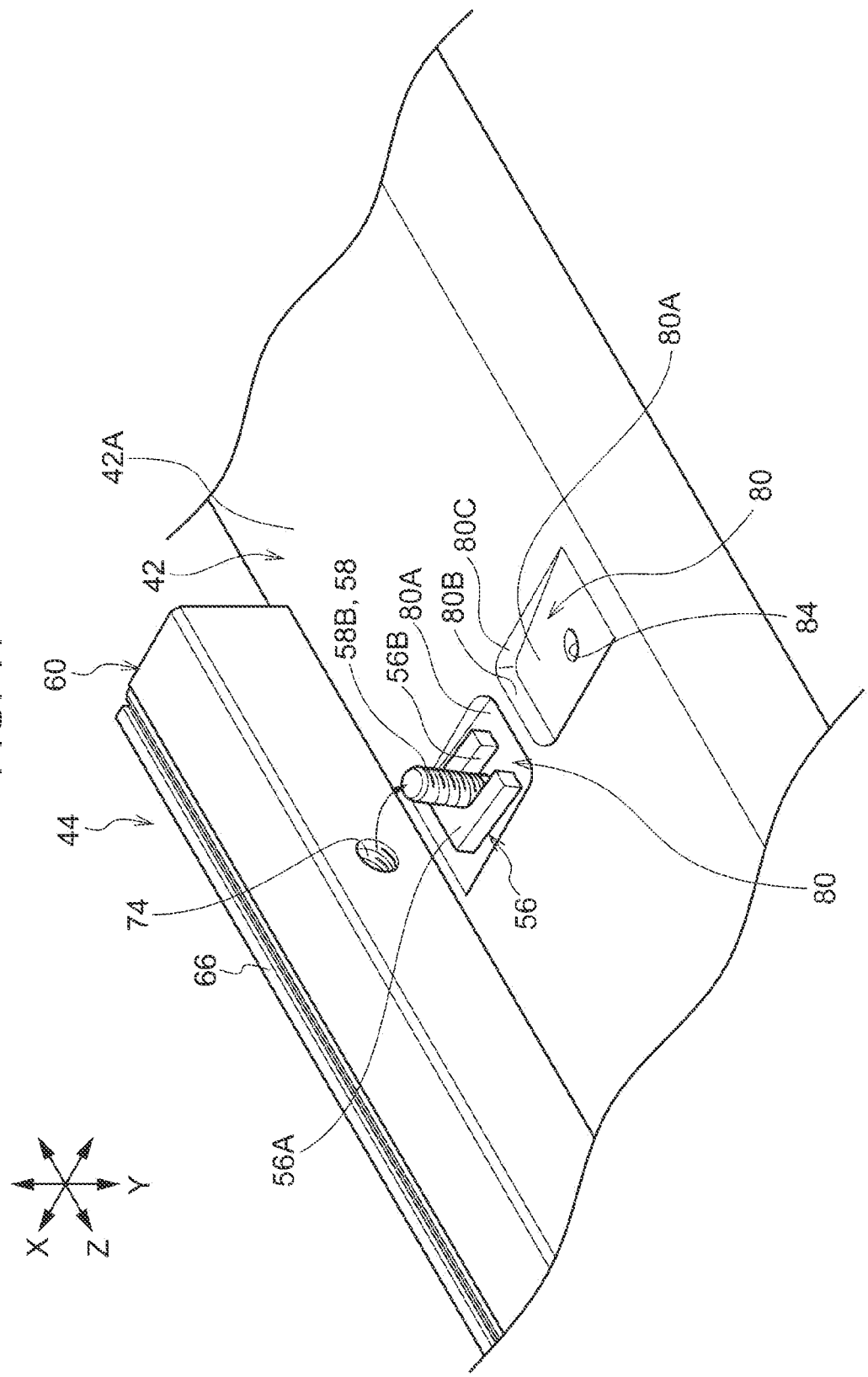
FIG. 11 is a perspective view illustrating a state in which a fastening member has been inserted through the spacer of the exposure device.

The inside diameter of the hollow portions 56B of the spacers 56 is larger than the outside diameters of the shaft portions 58B of the fastening members 58. The shaft portion 58B of each fastening member 58 passes through the hollow portion 56B of the corresponding spacer 56 (see FIG. 11). With each fastening member 58 being loosened with respect to the threaded hole 74 of the corresponding supporting body 60 (see FIG. 7), each spacer 56 is insertable into and removable from a space between the base 42 and the corresponding supporting body 60. In the exemplary embodiment, since the hollow portion 56B of each spacer 56 is open toward the inner side of the corresponding base 42 in the transverse direction (the direction of arrow X) (see FIG. 6), each spacer 56 can be inserted into and removed from an outer side of the corresponding base 42 in the transverse direction (the direction of arrow X).

For example, at the time of initial installation, each spacer 56 is disposed from an upper side of the corresponding recessed portion 80 of the corresponding base 42. In adjusting the focusing position of light of a light-emitting unit 44, when a spacer 56 is to be replaced, a spacer 56 is inserted into or removed in the direction of inclination of the inclined surface 80A from the space between the base 42 and the supporting body 60 with the fastening member 58 being loosened with respect to the threaded hole 74 of the supporting body 60 (see FIG. 7).

As described above, with respect to one light-emitting unit 44, three spacers 56 are disposed apart from each other in one direction of the base 42 (the direction of arrow Z). In the exemplary embodiment, in one light-emitting unit 44, two spacers 56 are disposed at two end portions of the supporting body 60 in one direction and one spacer 56 is disposed at the central portion of the supporting body 60 in the one direction (see FIG. 5). Here, the central portion of the supporting body 60 in the one direction refers to a ⅓ central portion in a length direction of the supporting body 60. The two end portions of the supporting body 60 in the one direction refer to two ⅓ side portions in the length direction of the supporting body 60. The thickness of the three spacers 56 that are disposed with respect to one light-emitting unit 44 may be adjusted by the position of the base 42 in the one direction (the direction of arrow Z). By adjusting the thickness of the three spacers 56, the focusing position of light of the light-emitting unit 44 can be adjusted in accordance with the position of the base 42 in the one direction (the direction of arrow Z).

For example, in a structure in which one spacer 56 is disposed in one direction of a base 42 (direction of arrow Z) with respect to one light-emitting unit 44, a focusing position of light from the light-emitting unit 44 is adjusted in an up-down direction (direction of arrow Y) in one dimension. For example, in a structure in which two spacers 56 are disposed apart from each other in one direction (direction of arrow Z) of a base 42 with respect to one light-emitting unit 44, a focusing position of light from the light-emitting unit 44 is adjusted in a straight line in a Y-Z plane in two dimensions. In other words, by adjusting the inclination of a supporting body 60 by using the difference between the thicknesses of the two spacers 56, the focusing position of the light is adjusted. In a structure in which three spacers 56 are disposed apart from each other in one direction (direction of arrow Z) of a base 42 with respect to one light-emitting unit 44 as in each exposure device 40 of the exemplary embodiment, a focusing position of light from the light-emitting unit 44 is adjusted in a curved line in a Y-Z plane in two dimensions. In other words, by adjusting the shape of a supporting body 60 into a curved shape by using the difference between the thicknesses of the three spacers 56, the focusing position of the light is adjusted.

Here, when a supporting body 60 is made of a resin material, its rigidity is lower than that of a metal, as a result of which the shape of the supporting body 60 is easily adjusted into a curved shape. On the other hand, as in the exemplary embodiment, when a supporting body 60 is formed from a metal block, its rigidity is considerably higher than that of the resin material, as a result of which the supporting body 60 is less likely be flexed and its shape is likely be adjusted into a curved shape. However, in a full-color printer for commercial printing, a slight difference in the focusing position may become a problem in terms of image quality. Therefore, even if the supporting body 60 is formed from a metal block that does not allow the shape of the supporting body to be easily adjusted into a curved shape, the adjustment may be made by using the difference between the thicknesses of three spacers 56. Note that the number of spacers 56 may be four or more.

When viewed from the direction of the optical axis of each light source 64, the spacers 56 are provided at positions overlapping the light sources 64. Due to such a structure, compared with when the spacers 56 are provided at positions that do not overlap the light sources 64, heat generated by the light sources 64 may easily escape toward the base 42 through the spacers 56. Note that although all of the spacers 56 may not be provided at positions that overlap the light sources 64, if all of the spacers 56 are provided at positions that overlap the light sources 64, a high-dissipation effect may be increased compared with that of a structure in which only one spacer 56 is provided at a position that overlaps a light source 64.

Operations and Effects

Next, operations and effects of the exemplary embodiment are described.

Each exposure device 40 includes a base 42 that extends in one direction (the direction of arrow Z) and light-emitting units 44, each light-emitting unit 44 being such that light sources 64 (see FIG. 7) disposed in the one direction are supported by a supporting body 60 extending in the one direction and formed from a metal block. Each exposure device 40 is provided with spacers 56, each of which is interposed between the base 42 and the corresponding light-emitting unit 44 in the direction of the optical axis of each light source 64 (see FIG. 7). Further, in each exposure device 40, each light-emitting unit 44 is fixed to the base 42 by the corresponding fastening member 58 in a mode in which a compressive load is applied to the spacers 56.

In each exposure device 40 above, the base 42 is disposed over the entire length of the corresponding photoconductor drum 32 in the axial direction. Three light-emitting units 44 are disposed so as to be displaced from each other in one direction of the base 42, and any one or more of the three light-emitting units 44 oppose a region, where a photoconductor is provided, of the photoconductor drum 32 in the axial direction of the photoconductor drum 32. In each exposure device 40, by illuminating the corresponding photoconductor drum 32 with light from the light-emitting units 44, an electrostatic latent image is formed on the region, where the photoconductor is provided, of the photoconductor drum 32.

Figure 13:
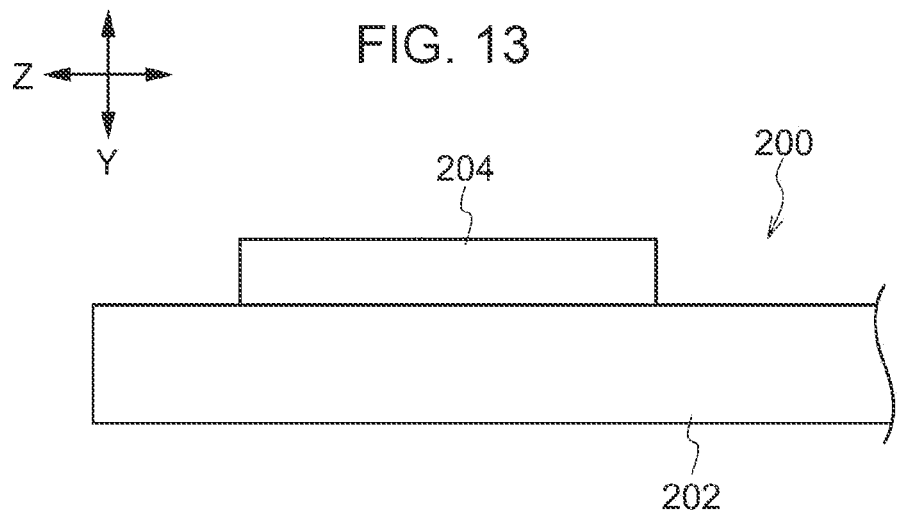
FIG. 13 is a side view illustrating a part of a light-emitting device according to Comparative Example 1.

Here, a light-emitting device 200 according to a Comparative Example 1 is described by using FIG. 13.

As illustrated in FIG. 13, in the light-emitting device 200, a light-emitting unit 204 is fixed to a base 202 with the light-emitting unit 204 in direct contact with the base 202. The light-emitting unit 204 may be fixed to the base 202 with an adhesive or with a fastening member (not shown).

In the light-emitting device 200, since the light-emitting unit 204 is in direct contact with the base 202, even if, for example, a driving substrate (not shown) generates heat at the time of driving of the light-emitting unit 204, heat dissipation to the base 202 from the light-emitting unit 204 may become good. However, in the light-emitting device 200, since the light-emitting unit 204 is in direct contact with the base 202, depending upon the surface precision of a bottom surface of the light-emitting unit 204 or a front surface of the base 202, variations in focuses of the light-emitting unit 204 may occur due to the position of the base 202 in a longitudinal direction (the direction of arrow Z). Here, "variations in focuses" refer to variations in focuses of the light-emitting unit in a longitudinal direction of the light-emitting device, such as variations in focuses caused by variations in mechanical components, such as a base, or variations in functional components, such as a lens portion, or variations in focuses with the passage of time caused by deformation due to self-weight or heat.

In contrast, in each exposure device 40 of the exemplary embodiment, spacers 56, each of which is interposed between the base 42 and the corresponding light-emitting unit 44 in the direction of the optical axis of each light source 64, are provided, and each light-emitting unit 44 is fixed to the base 42 by the corresponding fastening member 58 in a mode in which a compressive load is applied to the spacers 56.

Therefore, in each exposure device 40, due to the spacers 56, it is possible to adjust the positions of the light-emitting units (that is, the light sources 64) in one direction (direction Z) of the base 42, and to adjust the focusing positions resulting from the light sources 64. Consequently, in each exposure device 40, variations in focuses resulting from the positions of the light-emitting units 44 in one direction may be suppressed compared with when a light-emitting unit 44 is fixed to a base in a mode in which the light-emitting unit is in direct contact with the base.

In each exposure device 40, three spacers 56 are disposed apart from each other in one direction (direction Z) of the light-emitting units 44. In each exposure device 40, compared with when a spacer is disposed at one location of a light-emitting unit, it may be possible to adjust the tilting of each light-emitting unit 44 with respect to the base 42.

In each exposure device 40, compared with when a spacer is disposed at a central portion side of a supporting body, the precision of adjusting the tilting of each light-emitting unit 44 may be increased.

In each exposure device 40, compared with when two spacers are disposed apart from each other in one direction of a light-emitting unit, it may be possible to adjust the shape of each light-emitting unit 44 to a curved shape, that is, three-dimensionally adjust the shape of each light-emitting unit 44.

In each exposure device 40, with the light-emitting units 44 together with the base 42 being disposed on either side of the spacers 56, the light-emitting units 44 are fixed to the base 42 by a corresponding one of the fastening members 58. Therefore, in each exposure device 40, in a structure in which light-emitting units are provided on the base, variations between focuses of the light-emitting units 44 may be suppressed.

In each exposure device 40, the light-emitting units 44 are disposed so as to be displaced from each other in one direction of the base 42. Therefore, in each exposure device 40, compared with when light-emitting units are disposed in parallel on a base, it may be possible to illuminate a range that is long in the one direction of the base 42 with light.

Figure 14:
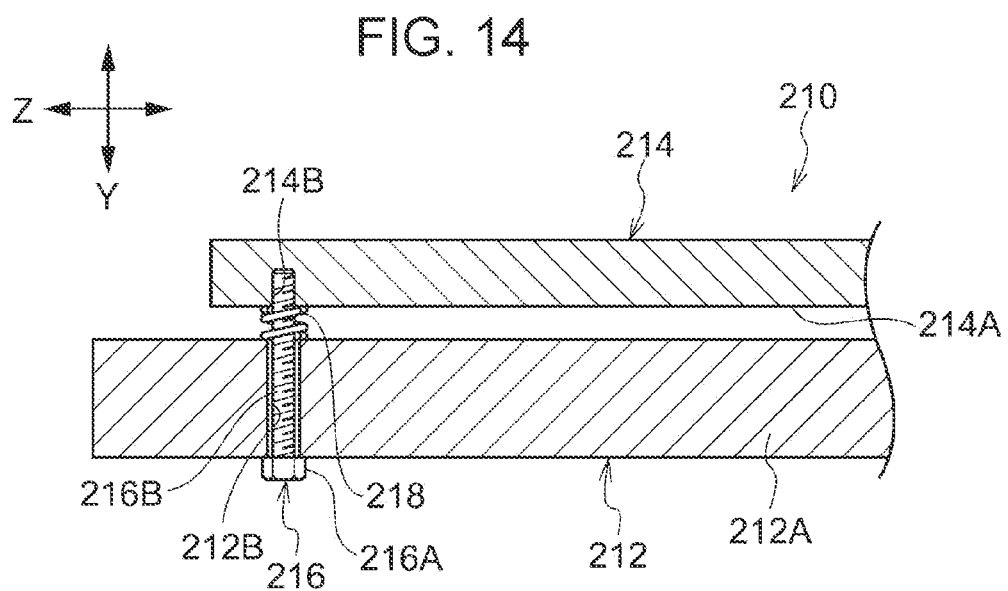
FIG. 14 is a sectional view illustrating a part of a light-emitting device according to Comparative Example 2.

Here, a light-emitting device 210 according to Comparative Example 2 is described by using FIG. 14.

As illustrated in FIG. 14, in the light-emitting device 210, a light-emitting unit 214 is fixed to an upper side of a base 212 in an up-down direction by a fastening bolt 216, and a coil spring 218 disposed around a shaft portion 216B of the fastening bolt 216 is interposed between the base 212 and the light-emitting unit 214. The base 212 is formed from a block member 212A, and the block member 212A has a through hole 212B, through which the shaft portion 216B of the fastening bolt 216 is inserted, in the up-down direction (direction of arrow Y). A bottom surface 214A of the light-emitting unit 214 has a threaded hole 214B to which the shaft portion 216B of the fastening bolt 216 is fastened.

In the light-emitting device 210, the shaft portion 216B of the fastening bolt 216 is inserted into the through hole 212B from a lower side of the base 212 in the up-down direction.

The coil spring 218 whose length in an axial direction is longer than a protrusion length of the shaft portion 216B is disposed around the shaft portion 216B protruding toward the upper side of the base 212 in the up-down direction. Further, the shaft portion 216B of the fastening bolt 216 is fastened to the threaded hole 214B of the light-emitting unit 214, and the shaft portion 216B is brought into contact with a lower surface of the base 212. At this time, the coil spring 218 is in a compressed state. Note that the structure of the light-emitting device 210 is included in the scope of the disclosure according to claim 1.

In the light-emitting device 210 above, by adjusting the compressive force of the coil spring 218, it is possible to adjust the focusing position of light of the light-emitting unit 214 in a longitudinal direction (direction Z) of the base 212. However, in the light-emitting device 210, since a heat-dissipation path to the base 212 from the light-emitting unit 214 is only the fastening bolt 216 and the coil spring 218, a heat-dissipation effect to the base 212 from the light-emitting unit 214 is reduced.

In contrast, in each exposure device 40 of the exemplary embodiment, the plate-shaped spacers 56 are each interposed between the base 42 and the corresponding light-emitting unit 44. Due to the plate-shaped spacers 56, the contact area between each spacer 56 and the base 42 and the contact area between each spacer 56 and the corresponding light-emitting unit 44 is increased. Therefore, in each exposure device 40, compared with when a spacer is a coil spring, heat may be easily dissipated to the base 42 from the light-emitting units 44.

In each exposure device 40, fastening members 58 passing through the corresponding spacers 56 are provided. Therefore, in each exposure device 40, compared with when a spacer is provided at a position differing from that of the fastening member, it may be possible to make compact mounting portions of the spacers 56.

In each exposure device 40, with the fastening members 58 loosened, the spacers 56 are each insertable into and removable from the space between the base 42 and the corresponding supporting body 60. Therefore, in each exposure device 40, compared with when a light-emitting unit is removed from a base when inserting or removing a spacer, it may be easy to adjust variations of focuses.

In each exposure device 40, the spacers 56 have a U shape when viewed from the direction of the optical axis of each light source 64. Therefore, in each exposure device 40, compared with when a spacer is of a division type, the structure of each spacer 56 may become simple. Since each spacer 56 is formed from one member, compared with when a spacer is of a division type, each spacer 56 may be easily handled.

In each exposure device 40, in the base 42, recessed portions 80 into which the spacers 56 are inserted are provided, and the inclined surfaces 80A that each form the bottom surface of the corresponding recessed portion 80 are cut surfaces. Therefore, in each exposure device 40, compared with when a spacer is disposed on a front surface of the base on an outer side, the precision of adjusting variations in focuses of the light-emitting units 44 may be increased. In each exposure device 40, compared with when a recessed portion of a base 42 is formed by using, for example, a die, the recessed portions 80 may be easily formed in the base 42.

In each exposure device 40, the base 42 has recessed portions 80 into which the spacers 56 are inserted, and each recessed portion 80 does not have a wall on at least one side in the transverse direction of the base 42. Therefore, in each exposure device 40, compared with when a wall is provided along a periphery of a recessed portion, the spacers 56 may be easily inserted into and removed from the recessed portions 80.

In each exposure device 40, the base 42 has recessed portions into which the spacers 56 are inserted, and the bottom surface of each recessed portion 80 is an inclined surface 80A that inclines with respect to the front surface 42A of the base 42. With each exposure device 40 being positioned with respect to the corresponding photoconductor drum 32, the inclination angle of each inclined surface 80A is an angle in which the optical axis extends toward the rotation center of the corresponding photoconductor drum 32. Therefore, compared with when a bottom surface of a recessed portion is parallel to a front surface of a base, light from each light-emitting unit 44 may perpendicularly strike the surface of the corresponding photoconductor drum 32. Therefore, for example, distortion in an illumination form of light at the surface of the photoconductor drum 32 may less likely occur. Even if the base 42 is displaced in the transverse direction of the base 42, variations in distance up to the surface of the corresponding photoconductor drum 32 may be suppressed. When the light sources 64 are light-emitting-element arrays having a staggered arrangement, differences in distances to the surface of the photoconductor drum 32 from the light-emitting-element arrays disposed so as to be displaced from each other in a transverse direction of the light-emitting units 44 may less likely occur.

In each exposure device 40, the light-emitting units 44 are disposed so as to be displaced in the transverse direction (the direction X) of the base 42, the inclined surfaces 80A with respect to the light-emitting units 44 on one side in the transverse direction and the inclined surfaces 80A with respect to the light-emitting unit 44 on the other side in the transverse direction have opposite inclinations. Therefore, in each exposure device 40, compared with when the inclination directions of inclined surfaces with respect to light-emitting units are the same, even if the light-emitting units 44 are disposed so as to be displaced from each other in the transverse direction of the bases 42, light from the light-emitting units 44 perpendicularly strikes the surface of the corresponding photoconductor drum 32. Therefore, for example, distortion may less likely occur in an illumination shape of the light on the surface of the corresponding photoconductor drum 32. Even if the base 42 is displaced in the transverse direction of the base 42, variations in distance up to the surface of the corresponding photoconductor drum 32 may be suppressed. Further, in the structure in which the light sources 64 are light-emitting-element arrays having a staggered arrangement, differences in distances to the surface of the corresponding photoconductor drum 32 from the light-emitting-element arrays disposed so as to be displaced from each other in the transverse direction of the light-emitting units 44 may less likely occur.

In each exposure device 40, spacers 56 having a thickness greater than or equal to the depth of the recessed portions 80 are disposed on the respective inclined surfaces 80A of the base 42. Therefore, in each exposure device 40, compared with when a spacer having a thickness less than the depth of a recessed portion is disposed, interference between the front surface 42A of the base 42 and each light-emitting unit 44 may be suppressed.

In each exposure device 40, the base 42 is formed from a metal block, and each spacer 56 is made of a material having a thermal conductivity higher than that of resin. Therefore, in each exposure device 40, compared with when a base or a spacer is made of resin, heat dissipation to the spacers 56 and the base 42 from the light-emitting units 44 may become good.

In each exposure device 40, each spacer 56 forms a heat-dissipation path toward the base 42 from the corresponding supporting body 60. Therefore, in each exposure device 40, compared with when a spacer is formed from an insulation portion, heat dissipation to the spacers 56 and the base 42 from the light-emitting units 44 may become good.

In each exposure device 40, the back surface 42B of the base 42 on a side opposite to the spacers 56 has recess-like portions 82 that have been cut out toward the spacers 56, and the light-emitting units 44 are fixed to the base 42 by the respective fastening members 58 from the insides of the respective recess-like portions 82. Therefore, in each exposure device 40, compared with when a light-emitting unit is fixed by a fastening member at a plate-shaped portion of a base, it may be possible to fix the light-emitting units 44 by short fastening members 58 without reducing the thickness of the entire base 42.

The image forming apparatus 10 including exposure devices 40 includes the exposure devices 40 and photoconductor drums 32 that move relative to the respective exposure devices 40 in a direction intersecting one direction (direction Z) and that are illuminated with light from the respective exposure devices 40. A region where a photosensitive material is disposed is provided at the surface of each photoconductor drum 32. Therefore, in the image forming apparatus 10, compared with when a light-emitting unit is fixed to a base in a mode in which the light-emitting unit is in direct contact with the base, a reduction in image quality when the corresponding photoconductor drum 32 is illuminated with image light may be suppressed.

In the image forming apparatus 10 including the exposure devices 40, the region where the photosensitive material is disposed is provided at the surface of the corresponding photoconductor drum 32, which is a cylindrical member that rotates in a peripheral direction. Therefore, in the image forming apparatus 10, in a structure in which the region of the surface of the cylindrical member is illuminated with light, a reduction in image quality when image light is applied may be suppressed.

Second Exemplary Embodiment

Figure 12:
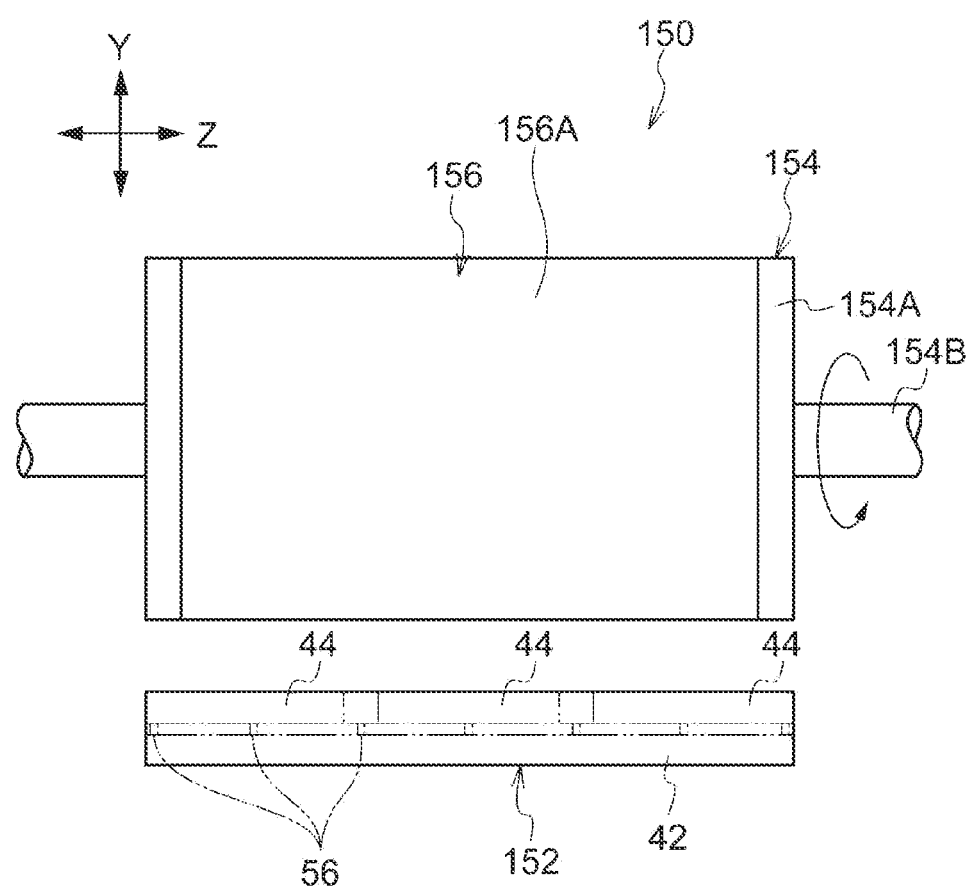
FIG. 12 is a structural view illustrating a drawing apparatus including an exposure device according to a second exemplary embodiment.

FIG. 12 illustrates a drawing apparatus 150 including a light-emitting device 152 according to a second exemplary embodiment. Note that structural portions that are the same as those of the first exemplary embodiment above are given the same reference numerals and are not described below.

As illustrated in FIG. 12, the drawing apparatus 150 includes the light-emitting device 152 and a cylindrical member 154 that is disposed in a longitudinal direction of the light-emitting device 152 and that rotates in a peripheral direction.

The light-emitting device 152 has the same structure as the exposure devices 40 of the first exemplary embodiment. More specifically, the light-emitting device 152 includes a base 42 that extends in one direction (direction Z), three light-emitting units 44, and spacers 56, each being interposed between the base 42 and the corresponding light-emitting unit 44. Similarly to the exposure devices 40 of the first exemplary embodiment, the light-emitting device 152 is provided with, for example, fastening members (not shown) that fix the light-emitting units 44 to the base 42 in a mode in which a compressive load is applied to the spacers 56.

The cylindrical member 154 includes a cylindrical portion 154A, and a shaft portion 154B that extends to two sides of the cylindrical portion 154A. The shaft portion 154B is rotatably supported by a frame (not shown), and the cylindrical portion 154A rotates in a peripheral direction due to the rotation of the shaft portion 154B.

A substrate 156 is attached to a surface of the cylindrical portion 154A. A region 156A where a photosensitive material is disposed is provided at a surface of the substrate 156. An example of the substrate 156 is a plate for a computer to plate (CTP) that is used in a plate making process of offset printing. An example of the region 156A where the photosensitive material is disposed is a region coated with the photosensitive material, such as a photoresist.

In the drawing apparatus 150, while rotating the cylindrical member 154, the region 156A, where the photosensitive material is disposed, of the substrate 156 is illuminated with light having a predetermined pattern from the light-emitting device 152. Therefore, the determined pattern is drawn on the region 156A, where the photosensitive material is disposed, of the substrate 156. Thereafter, by developing the substrate 156, a printing plate used in an offset printer is fabricated. Note that, as an example of a light source of the drawing apparatus 150 in this case, a laser element can be used.

The light-emitting device 152 above provides the following operations and effects in addition to the operations and effects provided by a structure that is the same as that of the exposure devices 40 of the first exemplary embodiment.

Similarly to the exposure devices 40 of the first exemplary embodiment, the light-emitting device 152 above includes a base 42, three light-emitting units 44, spacers 56, each being interposed between the base 42 and the corresponding light-emitting unit 44, and fastening members (not shown), each fixing the corresponding light-emitting unit 44 to the base 42. Therefore, in the drawing apparatus 150 including the light-emitting device 152, compared with when a light-emitting unit is fixed to a base in a mode in which the light-emitting unit is in direct contact with the base, a reduction in image quality when drawing may be suppressed.

In the drawing apparatus 150 including the light-emitting device 152 above, in a structure in which the region 156A, where the photosensitive material is disposed, of the substrate 156 at the surface of the cylindrical member 154 is illuminated with light, a reduction in image quality when drawing may be suppressed.

Supplementary Explanation

Although the exposure devices 40 of the first exemplary embodiment and the light-emitting device 152 of the second exemplary embodiment each include three light-emitting units 44 that are disposed on the base 42, the present disclosure is not limited to this structure. For example, one light-emitting unit may be disposed on the base, two light-emitting units may be disposed on the base, or four or more light-emitting units may be disposed on the base. The positions of the light-emitting units to be disposed on the base can also be set as appropriate.

In the exposure devices 40 of the first exemplary embodiment and the light-emitting device 152 of the second exemplary embodiment, the shape of the base 42 is changeable. For example, the structural components of the light-emitting units 44 or the shapes of the structural components of the light-emitting units 44 are changeable.

In the exposure devices 40 of the first exemplary embodiment and the light-emitting device 152 of the second exemplary embodiment, for example, the number of spacers 56 or the shapes of the spacers 56 are changeable. For example, with respect to one light-emitting unit, one spacer may be disposed, or at least two or more spacers may be disposed apart from each other in one direction of the base. For example, when two spacers are disposed with respect to one light-emitting unit, the spacers may be disposed one on each end portion in one direction of the supporting body of the light-emitting unit. The spacers are not limited to plate-shaped spacers and may be, for example, block-shaped spacers. The spacers may be divided into two or more segments instead of being one member.

In the exposure devices 40 of the first exemplary embodiment and the light-emitting device 152 of the second exemplary embodiment, the spacers may be disposed on the front surface of the base without providing recessed portions 80 in the base 42. The spacers may be disposed each on a plate-shaped bottom surface of the corresponding recessed portion without providing inclined surfaces. Even when the recessed portions have inclined surfaces, the inclined surfaces on two sides of the base in the transverse direction may be inclined in the same direction instead of being inclined in opposite directions. Even when the recessed portions have inclined surfaces, walls may be provided around the peripheries of the inclined surfaces. The spacers may be provided at positions that are separated from fixing units, such as the fastening members.

In the drawing apparatus 150 of the second exemplary embodiment, although the substrate 156 attached to the cylindrical portion 154A of the cylindrical member 154 is illuminated with light from the light-emitting device 152, the present disclosure is not limited to this structure. For example, a substrate may be disposed on a flat-plate-shaped table, the light-emitting device 152 and the table may be moved relative to each other in a direction intersecting one direction of the light-emitting device 152, and the substrate may be illuminated with light from the light-emitting device 152.

In the drawing apparatus 150 of the second exemplary embodiment, although the substrate 156 is a plate for CTP that is used in a plate making process of offset printing, and the region 156A, where the photosensitive material is disposed, of the substrate 156 is illuminated with light from the light-emitting device 152, the present disclosure is not limited to this structure. For example, the light-emitting device and the drawing apparatus above can be used in exposure when manufacturing a printed wiring board (PWB). For example, the printed wiring board may be manufactured by, without using a photo mask, performing direct drawing on a substrate coated with a photosensitive material, such as a photoresist. The board to be used may be a rigid board or a flexible board. When a flexible board is used, drawing may be performed while rotating the board with the board being fixed to the cylindrical member 154 in FIG. 12.

Further, the light-emitting device and the drawing apparatus above can be used in applications for members to which photolithography is applied, such as forming color filters in a manufacturing process of a liquid crystal display (LCD), exposing a dry film resist (DFR) in a manufacturing process of a thin film transistor (TFT), exposing a dry film resist (DFR) in a manufacturing process of a plasma display panel (PDP), exposing a photosensitive material, such as a photoresist, in a manufacturing process of a semiconductor element, exposing a photosensitive material, such as a photoresist, in a plate making process for printing other than offset printing, such as gravure printing, or exposing a photosensitive material in a manufacturing process of a timepiece component. Here, "photolithography" refers to a technology of producing a pattern by exposing with a pattern shape a surface of a substance where a photosensitive material is disposed, the pattern having an exposed portion and an unexposed portion.

The exposure devices and the drawing apparatus above can use either a photon-mode photosensitive material on which information is directly recorded by exposure or a heat-mode photosensitive material on which information is recorded by heat produced by exposure. As a light source of the drawing apparatus 150, a LED element or a laser element can be used in accordance with an object to be exposed.

Although the present disclosure has been described in detail with regard to specific exemplary embodiments, the present disclosure is not limited to such exemplary embodiments and it is obvious to any person skilled in the art that various exemplary embodiments are possible within the scope of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A light-emitting device comprising:
   a base that extends in one direction;
   a light-emitting unit in which a plurality of light sources that are disposed in the one direction are supported by a supporting body that extends in the one direction and that is formed from a metal block;
   a spacer that is interposed between the base and the light-emitting unit in a direction of an optical axis of each light source; and
   a fixing unit that fixes the light-emitting unit to the base in a mode in which a compressive load is applied to the spacer, wherein
   the base has a recessed portion into which the spacer is to be inserted, and a bottom surface of the recessed portion is an inclined surface that is inclined with respect to a surface of the base, and
   a plurality of the light-emitting units are provided, and are disposed so as to be displaced from each other in a transverse direction of the base, and wherein the inclined surface with respect to the light-emitting unit disposed on one side in the transverse direction and the inclined surface with respect to the light-emitting unit disposed on the other side in the transverse direction have opposite inclinations.

2. The light-emitting device according to claim 1, wherein at least two of the spacers are provided, and are disposed apart from each other in the one direction.

3. The light-emitting device according to claim 2, wherein the spacers are disposed at two end portions of the supporting body in the one direction.

4. The light-emitting device according to claim 2, wherein at least three of the spacers are provided, and are disposed apart from each other in the one direction.

5. The light-emitting device according to claim 2, wherein the plurality of the light-emitting units are fixed to the base by the fixing unit with the spacers being interposed between the plurality of the light-emitting units and the base.

6. The light-emitting device according to claim 5, wherein the plurality of the light-emitting units are disposed so as to be displaced from each other in the one direction.

7. The light-emitting device according to claim 1, wherein the fixing unit includes a fastening member that passes through the spacer.

8. The light-emitting device according to claim 7, wherein the spacer is insertable into and removable from a space between the base and the supporting body with the fastening member being loosened.

9. The light-emitting device according to claim 8, wherein the spacer is a plate-shaped spacer.

10. The light-emitting device according to claim 9, wherein the spacer has a U shape when seen from the direction of the optical axis of each light source.

11. The light-emitting device according to claim 8, wherein the recessed portion does not have a wall on at least one side in a transverse direction of the base.

12. The light-emitting device according to claim 1, wherein the bottom surface of the recessed portion is a cut surface.

13. The light-emitting device according to claim 1, wherein the spacer having a thickness greater than or equal to a depth of the recessed portion is disposed at the inclined surface.

14. The light-emitting device according to claim 1, wherein the base is formed from a metal block, and the spacer is made of a material having a thermal conductivity that is higher than a thermal conductivity of polyacetal resin.

15. The light-emitting device according to claim 14, wherein the spacer forms a heat-dissipation path toward the base from the supporting body.

16. The light-emitting device according to claim 1, wherein a surface of the base on a side opposite to the spacer has a recess-like portion that has been cut out toward the spacer, and
  wherein the light-emitting unit is fixed to the base by a fastening member from an inside of the recess-like portion, the fastening member constituting the fixing unit.

17. A drawing apparatus comprising:
  the light-emitting device according to claim 1; and
  a region where a photosensitive material is disposed, the region moving relative to the light-emitting device in a direction that intersects the one direction and being illuminated with light from the light-emitting device.

18. The drawing apparatus according to claim 17, wherein the region is provided at a surface of a cylindrical member that rotates in a peripheral direction.

* * * * *